(12) United States Patent
Inouye

(10) Patent No.: US 12,173,843 B2
(45) Date of Patent: *Dec. 24, 2024

(54) MULTI-USE MOUNTING BRACKET FOR GYM ACCESSORIES

(71) Applicant: Warren Inouye, Irvine, CA (US)

(72) Inventor: Warren Inouye, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/484,422

(22) Filed: Oct. 10, 2023

(65) Prior Publication Data

US 2024/0110665 A1 Apr. 4, 2024

Related U.S. Application Data

(60) Continuation of application No. 18/084,806, filed on Dec. 20, 2022, now Pat. No. 11,781,711, which is a
(Continued)

(51) Int. Cl.
*F16M 13/00* (2006.01)
*A61H 15/00* (2006.01)
(Continued)

(52) U.S. Cl.
CPC ........... *F16M 13/022* (2013.01); *A61H 15/00* (2013.01); *A63B 17/04* (2013.01); *A61H 2015/0014* (2013.01); *A61H 2201/0107* (2013.01); *A61H 2201/1261* (2013.01); *A61H 2201/1284* (2013.01); *A63B 21/0442* (2013.01); *A63B 21/0557* (2013.01); *A63B 21/06* (2013.01); *A63B 23/1218* (2013.01); *A63B 23/1227* (2013.01); *A63B 23/1236* (2013.01); *A63B 2225/093* (2013.01)

(58) Field of Classification Search
CPC .................. F16M 13/022; A61H 15/00; A61H 2015/0014; A61H 2201/0107; A61H 2201/1261; A61H 2201/1284; A61H 2205/04; A61H 2205/088; A61H 2015/0042; A61H 2205/062; A61H 2205/081; A61H 2015/0007; A61H 2201/0119; A63B 17/04; A63B 21/0442; A63B 21/0557; A63B 21/06; A63B 23/1218; A63B 23/1227; A63B 23/1236; A63B 2225/093; A63B 21/16
See application file for complete search history.

(56) References Cited

U.S. PATENT DOCUMENTS 4,286,782 A * 9/1981 Fuhrhop ................ A63B 23/00
482/99
4,452,336 A * 6/1984 Sickler ...................... E04G 5/04
248/216.1
(Continued)

*Primary Examiner* — Amy J. Sterling
(74) *Attorney, Agent, or Firm* — Chang & Hale LLP

(57) ABSTRACT

Described herein are methods of manufacturing multi-use mounting brackets having an extension with an internal support rod configured to support gym accessories. A single multi-use mounting bracket fits gym rigging or gym racks of different sizes and hole configurations. This accomplished by including multiple pairs of holes that are sized and positioned to be compatible with different gym rigging configurations. The multi-use mounting brackets described herein are advantageously designed to resist both downward and upward forces.

15 Claims, 17 Drawing Sheets

Related U.S. Application Data division of application No. 16/581,586, filed on Sep. 24, 2019, now Pat. No. 11,530,777, which is a continuation of application No. 15/798,336, filed on Oct. 30, 2017, now Pat. No. 10,422,473, which is a continuation-in-part of application No. 15/357,590, filed on Nov. 21, 2016, now Pat. No. 10,422,472.

(60) Provisional application No. 62/438,312, filed on Dec. 22, 2016.

(51) Int. Cl.
*A63B 17/04* (2006.01)
*F16M 13/02* (2006.01)
*A63B 21/04* (2006.01)
*A63B 21/055* (2006.01)
*A63B 21/06* (2006.01)
*A63B 23/12* (2006.01)

(56) References Cited

U.S. PATENT DOCUMENTS

| | | | | |
|---|---|---|---|---|
| 4,913,419 A * | 4/1990 | McAuliffe | ............ | A63B 69/222 482/87 |
| 5,236,095 A * | 8/1993 | Krizka | ................... | A47B 47/00 211/96 |
| 5,660,637 A * | 8/1997 | Dodge | ................ | B05B 13/0285 211/208 |
| 5,791,502 A * | 8/1998 | Bietz | ...................... | A47B 57/50 211/192 |
| 6,758,448 B1 * | 7/2004 | Williams | ............... | A47B 96/02 248/125.1 |
| 7,360,627 B2 * | 4/2008 | Scott | .................... | A47B 96/061 182/150 |
| 7,699,756 B2 * | 4/2010 | Piane, Jr. | ................. | A63B 1/00 248/222.52 |
| 9,303,832 B2 * | 4/2016 | Sun | .......................... | F21L 4/04 |
| 9,333,387 B2 * | 5/2016 | Hopperstad | ....... | A63B 21/00047 |
| 10,487,907 B1 * | 11/2019 | Mohamed | ............... | F16L 13/06 |
| 10,792,535 B2 * | 10/2020 | Chou | ....................... | A63B 1/00 |
| 10,905,234 B1 * | 2/2021 | Schindehette | ..... | A47B 47/0058 |
| 10,905,240 B2 * | 2/2021 | Bowser | ................ | A47B 96/061 |
| 10,953,301 B2 * | 3/2021 | Brasch | ..................... | A63B 1/00 |
| 11,660,491 B2 * | 5/2023 | Henniger | ............... | F16M 13/02 482/104 |
| 11,872,436 B2 * | 1/2024 | Nesemeier | ........... | A63B 21/062 |
| 2006/0040799 A1 * | 2/2006 | Pompile | ............. | A63B 21/4035 482/148 |
| 2016/0258177 A1 * | 9/2016 | Faries | .................... | F16M 13/02 |
| 2018/0178051 A1 * | 6/2018 | Shaw, Jr. | .............. | A63B 21/078 |
| 2022/0233909 A1 * | 7/2022 | Williams | ........... | A63B 21/0628 |

\* cited by examiner

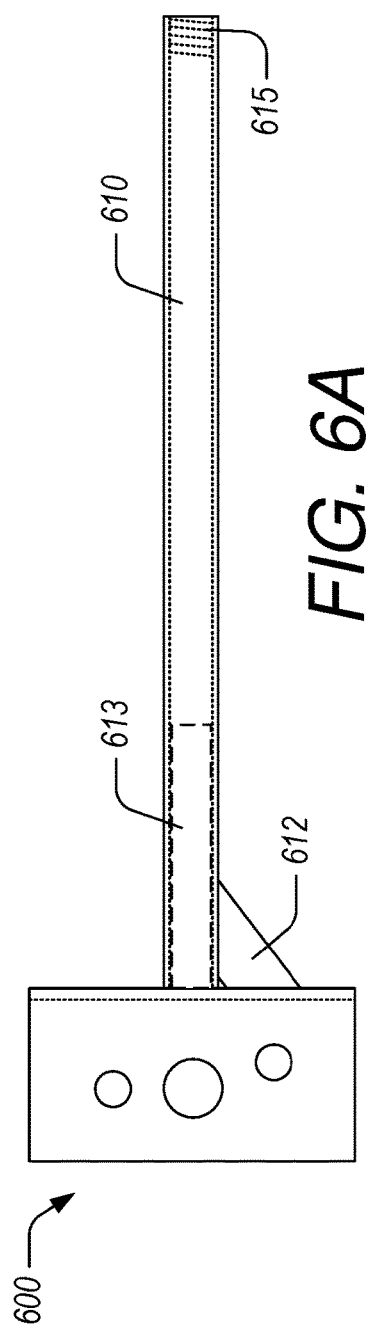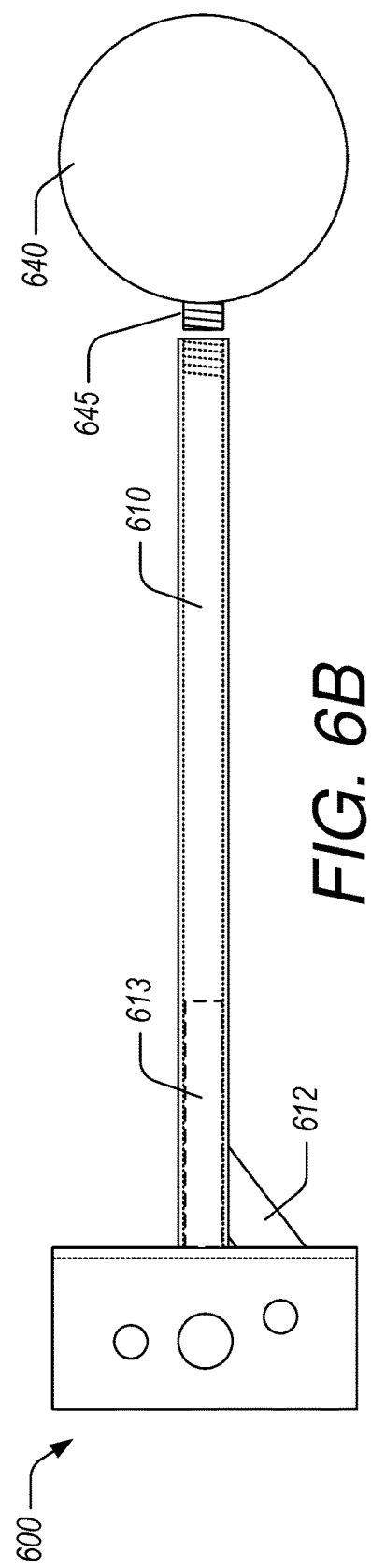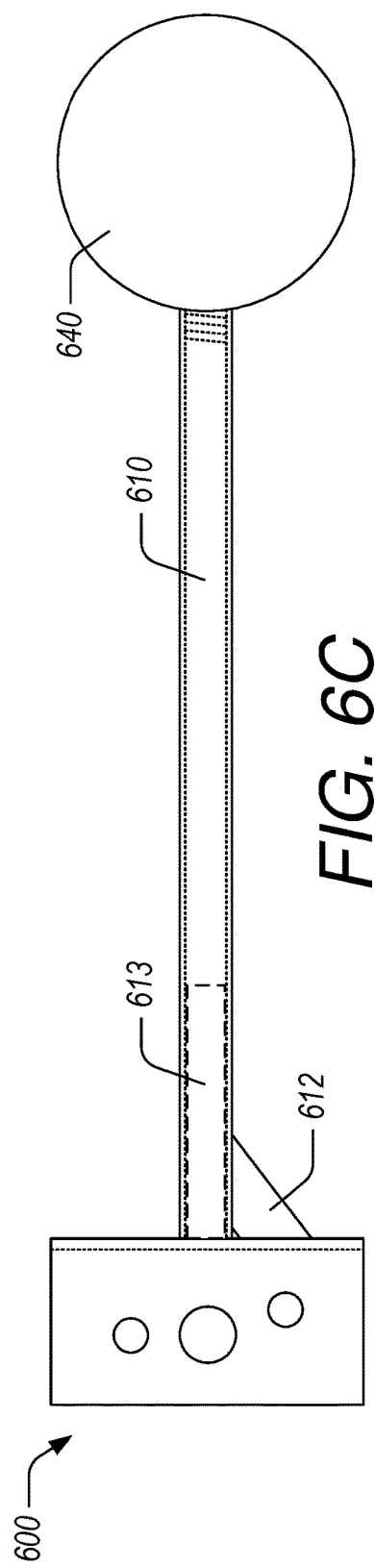

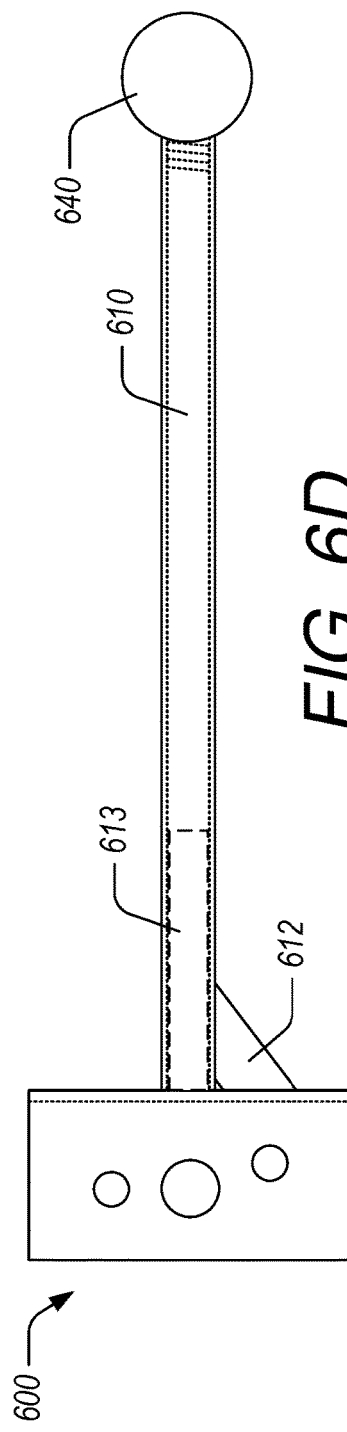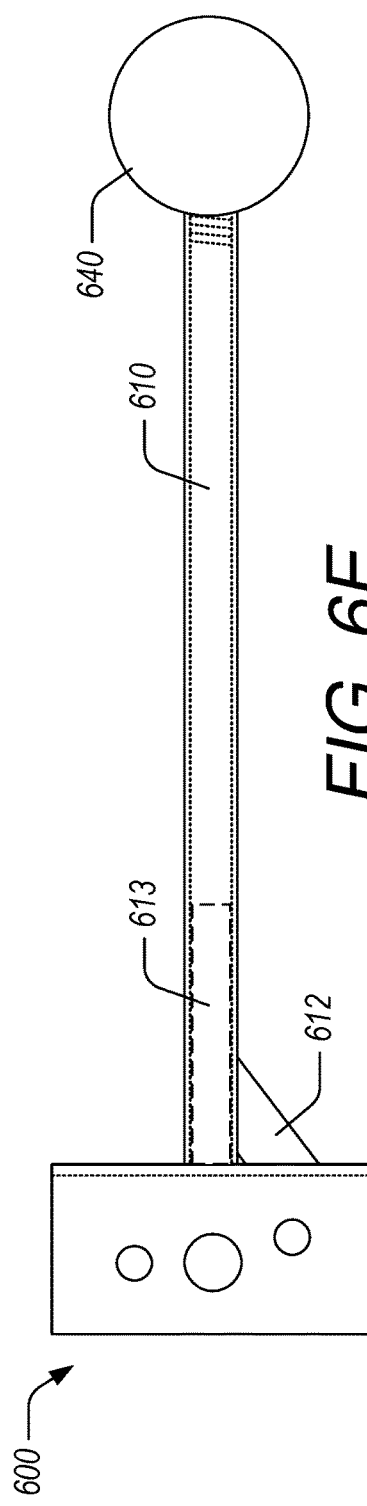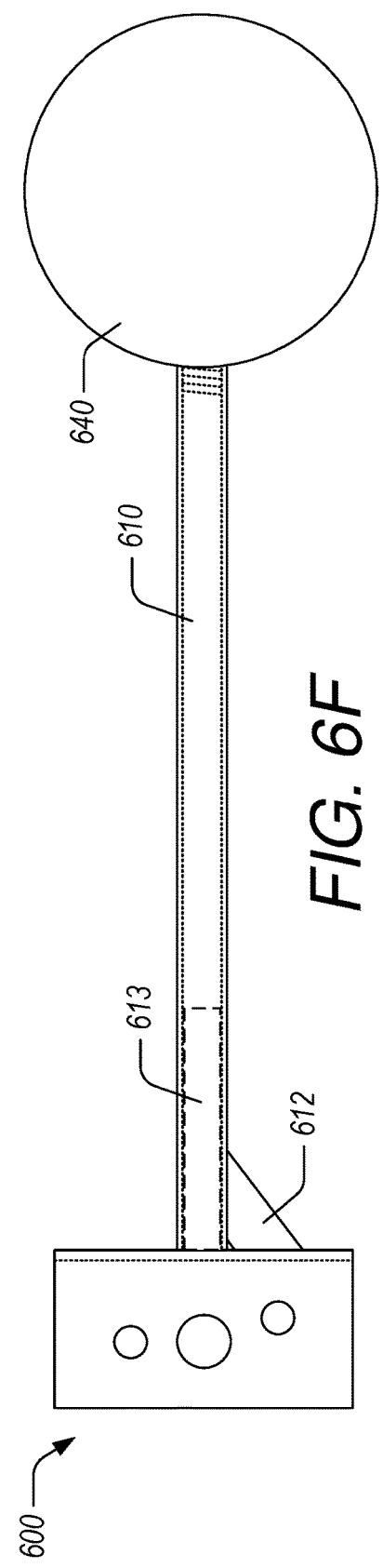

MULTI-USE MOUNTING BRACKET FOR GYM ACCESSORIES

CROSS-REFERENCE TO RELATED APPLICATIONS

This application is a continuation of U.S. application Ser. No. 18/084,806 filed Dec. 20, 2022 and entitled "Multi-Use Mounting Bracket with Extension and Internal Support Rod for Gym Accessories," which is a division of U.S. application Ser. No. 16/581,586 filed Sep. 24, 2019 and entitled "Multi-Use Mounting Bracket with Extension and Internal Support Rod for Gym Accessories," which is a continuation of U.S. application Ser. No. 15/798,336 filed Oct. 30, 2017 and entitled "Multi-use Mounting Bracket with Extension for Therapeutic Devices and Gym Accessories" (now U.S. Pat. No. 10,422,473 issued Sep. 24, 2019), which claims priority to U.S. Provisional Application No. 62/438,312 filed Dec. 22, 2016 and entitled "Roller Remedy," and which is a continuation-in-part of U.S. application Ser. No. 15/357,590 filed Nov. 21, 2016 and entitled "Device for Mounting Accessories to Gym Rigging Implements" (now U.S. Pat. No. 10,422,472 issued Sep. 24, 2019), each of which is expressly incorporated by reference herein in its entirety for all purposes.

BACKGROUND

Field

The present disclosure relates to therapeutic apparatuses that are configured to be mounted to gym equipment.

Description of Related Art

Exercise equipment includes rigs, stands, racks, and the like that support various exercise accessories. Typically, such exercise equipment enables a person to perform various exercises using weights, barbells, dumbbells, pull-up bars, dip stations, self-spotting bars, cables, ropes, elastic bands, and the like. Moreover, exercise equipment can support therapeutic apparatuses that allow users to stretch, to self-massage, and/or to apply pressure to tissue (e.g., for myofascial release). Because exercise equipment supports a wide variety of activities and accessories, the equipment can vary in size, strength, durability, rigidity, configuration, and the like. This may result in a relatively large variation in the elements that make up the exercise equipment, such as the size of vertical posts, the size of joists connecting the vertical posts, the type or thickness of material used for the posts and joists, the size of holes in the posts, the spacing of the holes in the posts, and the like.

SUMMARY

In a number of implementations, the present disclosure relates to a multi-use mounting bracket for mounting a gym accessory to different configurations of gym rigging. The bracket includes a face plate having an outer face, an inner face, a first side edge, a second side edge, a top edge, and a bottom edge. The bracket also includes a first side flange extending from the inner face on the first side edge of the face plate. The bracket also includes a second side flange extending from the inner face on the second side edge of the face plate, the second side flange parallel to the first side flange. The bracket also includes an extension having a proximal end affixed to the outer face of the face plate. The first side flange forms a first top hole having a first diameter, the center of the first top hole positioned a first distance from the inner face, and a first bottom hole having a second diameter, the center of the first bottom hole positioned a second distance from the inner face different from the first distance. The second side flange forms a second top hole aligned with the first top hole and having the first diameter, the center of the second top hole positioned the first distance from the inner face, and a second bottom hole aligned with the first bottom hole and having the second diameter, the center of the second bottom hole positioned the second distance from the inner face.

In some embodiments, the first diameter is equal to the second diameter. In further embodiments, the first top hole and the second top hole are configured to align with perforations of a first gym rigging configuration and the first bottom hole and the second bottom hole are configured to align with perforations of a second gym rigging configuration different from the first gym rigging configuration. In further embodiments, the first side flange forms a first middle hole having a third diameter different from the first diameter, the center of the first middle hole positioned the first distance from the inner face, and the second side flange forms a second middle hole aligned with the first middle hole and having the third diameter, the center of the second middle hole positioned the first distance from the inner face. In yet further embodiments, the third diameter is greater than the first diameter. In yet further embodiments, the first diameter is sized to receive a first pin having a first size and the third diameter is sized to receive a second pin having a second size greater than the first size. In further embodiments, the first top hole and the second top hole are configured to align with perforations of a first gym rigging configuration, the first middle hole and the second middle hole are configured to align with perforations of a second gym rigging configuration different from the first gym rigging configuration, and the first bottom hole and the second bottom hole are configured to align with perforations of a third gym rigging configuration different from the first and second gym rigging configurations.

In some embodiments, the bracket further includes a gusset attached to the outer face of the face plate and to the extension to provide additional mechanical support to the extension. In further embodiments, the extension comprises a hollow cylinder. In further embodiments, the bracket also includes a support rod affixed to the outer surface of the face plate, the support rod positioned within the hollow cylinder of the extension to provide additional mechanical support to the extension.

In some embodiments, the extension comprises a threaded female receptacle at a distal end of the extension. In some embodiments, the center of the first top hole is positioned at least 1.5 inches from the top edge of the face plate. In further embodiments, the center of the first bottom hole is positioned at least 1.5 inches from the bottom edge of the face plate.

In some embodiments, the face plate is at least 6 inches from the bottom edge to the top edge. In some embodiments, the face plate, the first side flange, and the second side flange are formed from a single piece of metal. In some embodiments, the first distance is about 1.5 inches and the second distance is about 1 inch. In some embodiments, the face plate has a width of about 3⅛ inches between the first side edge and the second side edge. In some embodiments, the bracket further includes a cushion affixed to the inner face of the face plate. In some embodiments, the extension is greater than or equal to 18 inches and less than or equal to 24 inches in length. In some embodiments, the extension is less than or equal to 2 inches in length.

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

BRIEF DESCRIPTION OF THE DRAWINGS

A further understanding of the nature and advantages of the disclosed embodiments may be understood by reference to the following drawings. In the figures, similar components or features may share the same reference label or similar numbering. It should be understood that the drawings are not to scale and measurements, sizes, or positioning are not to be inferred from the sizes and placement of the elements in the following figures.

FIGS. 6A, 6B, 6C, 6D, 6E, and 6F illustrate an example multi-use mounting bracket with an extension that is configured to receive various therapeutic devices.

DETAILED DESCRIPTION OF SOME EMBODIMENTS

Figure 1A:
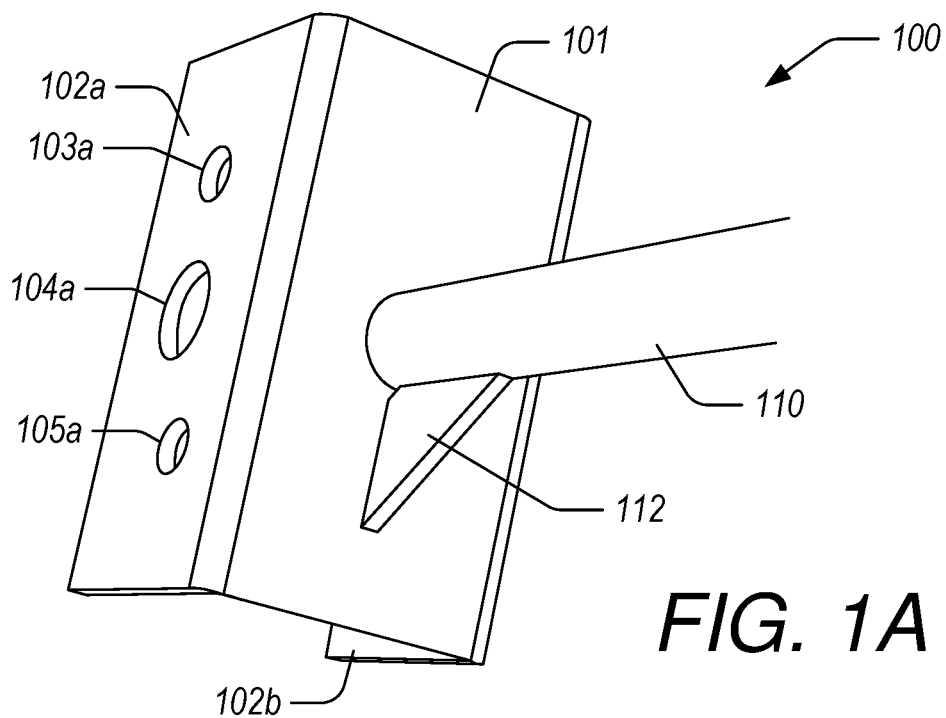
FIGS. 1A and 1B illustrate various views of an example multi-use mounting bracket with an extension for a therapeutic apparatus.

The headings provided herein, if any, are for convenience only and do not necessarily affect the scope or meaning of the claimed invention.

Overview

Typically, gym or exercise equipment such as gym rigging, power racks, weight stands, and the like come in a variety of sizes and configurations. In particular, gym or exercise equipment includes a frame structure that includes posts, joists, beams, and/or horizontal and vertical support members and can be free-standing or secured to a floor, ceiling, and/or to a wall of a gym or building. The frame structure can include upright or vertical posts that support exercise accessories such as weights, spotter bars, pins, J-hooks, rods, self-massage attachments, matador devices for performing dips, storage for weight plates, push up bars, pull up bars, and the like.

The upright or vertical posts typically include holes that are spaced apart so that a user can adjust the position of these accessories to accommodate different users and different exercises. Brackets can be releasably attached to the frame structure using pins that insert into the holes to secure the brackets to the frame structure. Such brackets can be configured to support various exercise accessories. For example, an accessory can be permanently attached to a bracket (e.g., through welding) or an accessory can be temporarily or releasably attached to a bracket (e.g., through a threaded or other type of receptacle on the bracket and a mating component on the accessory) to enable the accessory to be coupled to and supported by the frame structure. Sizes of exercise equipment (e.g., gym rigging) that are in common use include but are not limited to: 2×2 gym rigging (i.e., a vertical post has a width that is about 2 inches and a depth that is about 2 inches), 2×3 gym rigging (i.e., a vertical post has a width that is about 2 inches and a depth that is about 3 inches), light weight 3×3 rigging (i.e., a vertical post has a width that is about 3 inches and a depth that is about 3 inches), and heavy weight 3×3 rigging (i.e., a vertical post has a width that is about 3 inches, a depth that is about 3 inches, and a thickness of the metal forming the posts is greater than the light weight 3×3 rigging). For each of these sizes, the hole size and/or spacing may be different. For example, the holes may be as close to each other as one inch to provide a desired amount of adjustability in the height of accessories that can be mounted to the gym rigging. Similarly, the diameter of the holes can vary in size from about ½ inch to about 1 inch. Quick detach pins can be used to secure the bracket to the post. The quick detach pins are configured to be compatible with certain hole sizes and for certain gym rigging dimensions (e.g., 2×3 rigging, 3×3 rigging, etc.).

Typical accessory brackets are made to attach to a specific size of rigging and typically cannot be used interchangeably between rigging of different sizes. For example, an accessory bracket that is made for 2×3 rigging typically cannot fit 3×3 rigging because the holes of the 2×3 accessory bracket do not match the perforations in the 3×3 rigging. Thus, in a gym with multiple rigging sizes, it may be necessary to purchase separate brackets and/or accessories for each size of rigging. In addition, typical brackets are designed to support accessories on the gym rigging in a way that resists downward forces but that are susceptible to malfunction (e.g., the bracket and the accessory are tilted upward) or breaking when upward forces are applied. Moreover, due to a lack of uniformity in the design, size, and/or shape of brackets, there may be many different methods and systems for mounting accessories to gym rigging, leading to added costs and clutter in a gym.

Accordingly, described herein are examples of multi-use mounting brackets having an extension configured to support one or more therapeutic apparatuses or other equipment accessories. Some embodiments disclosed herein relate to a multi-use mounting bracket that advantageously fits gym rigging or gym racks of different sizes and hole configurations. In some embodiments, the multi-use mounting bracket can be configured to include an accessory receptacle to securely and releasably attach to therapeutic devices and gym accessories. In various embodiments, the multi-use mounting bracket can include a permanently welded extension that can receive therapeutic devices at a distal end of the rod and that can support therapeutic devices such as foam rollers and other self-massaging apparatuses around the rod. Advantageously, the multi-use mounting bracket includes a plurality of holes that are configured to be compatible with different sizes or varieties of gym rigging and racks (e.g., 2×2 rigging, 2×3 rigging, light weight 3×3 rigging, heavy weight 3×3 rigging, fitness stands, squat racks, exercise racks, power racks, weight racks, and the like). The multi-use mounting bracket with a receptacle or with an extension is advantageously designed to resist both downward and upward forces.

Embodiments described herein enable a single multi-use mounting bracket to fit gym rigging or gym racks of different sizes and hole configurations. This accomplished by including multiple pairs of holes that are sized and positioned to be compatible with different gym rigging configurations.

Although the description of the multi-use mounting brackets herein focuses on its use with 2×3 rigging, light weight 3×3 rigging, and heavy weight 3×3 rigging, it is to be understood that the multi-use brackets disclosed herein can be configured to work with different sizes and configurations of gym riggings, power racks, and other types of exercise frame structures. The disclosed multi-use brackets, for example and without limitation, can include 2 or more pairs of holes formed by the side flanges wherein an individual pair of holes corresponds to one or more configurations of an exercise frame structure and different pairs of holes formed on a side flange correspond to different configurations of exercise frame structures. In this way, a single multi-use mounting bracket is configured to be compatible with a plurality of different gym rigging configurations. Although the description of the multi-use mounting brackets herein focuses on its use with vertical posts or supports, it is to be understood that the multi-use brackets disclosed herein can be configured to work with horizontal posts or joists and other exercise frame structures.

Example Multi-Use Mounting Brackets

Figure 1B:
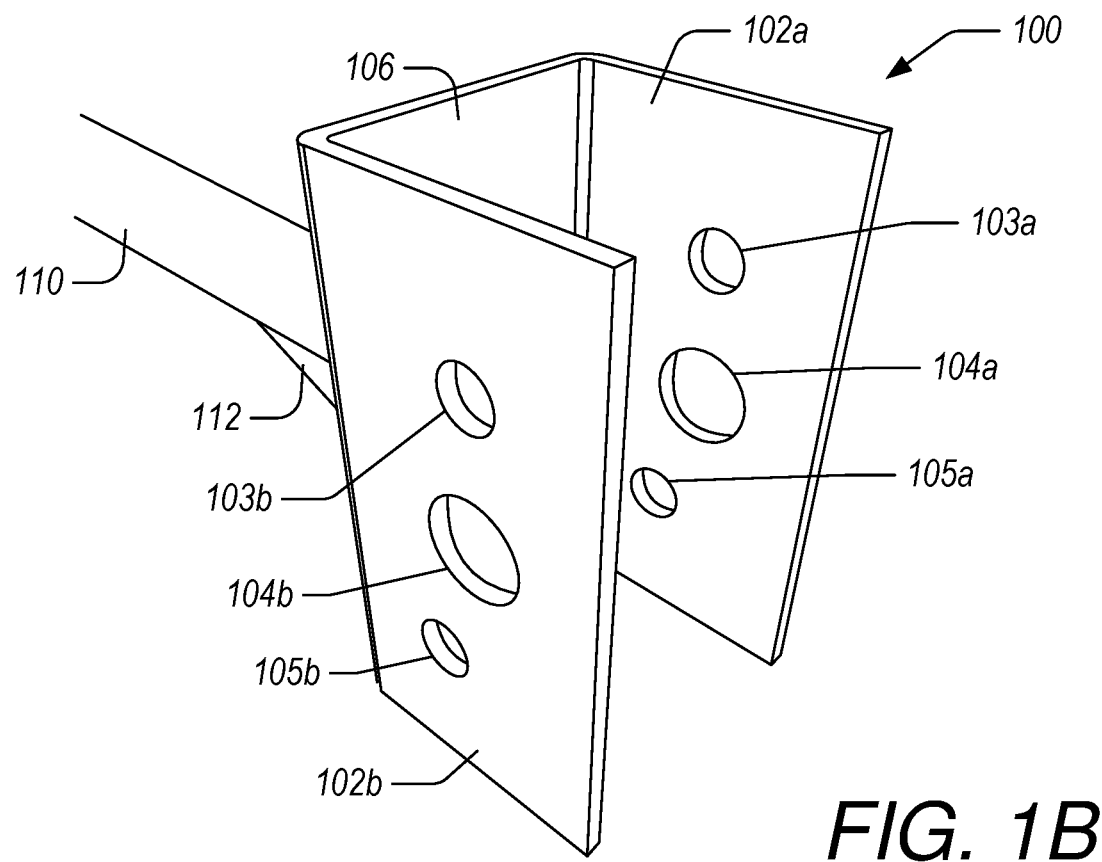

FIGS. 1A and 1B illustrate various views of an example multi-use mounting bracket 100 with an extension 110 for a therapeutic apparatus. The multi-use mounting bracket 100 includes a face plate 101 with side flanges 102a, 102b forming a rectangular U-shaped bracket. The extension 110 is attached to the face plate 101 and extends from the face plate 101 in a direction opposite to the direction the side flanges 102a, 102b extend from the face plate 101. In some embodiments, the multi-use mounting bracket 100 includes a gusset 112 to provide structural support to the extension 110.

The multi-use mounting bracket 100 includes an inner face 106 opposite the face plate 101. The width of the inner face 106 (e.g., the distance between the side flanges 102a, 102b) can be configured to fit on a post structure so that there is a relatively small distance between external sides of the post and inner faces of the side flanges 102a, 102b when secured to the post. Although the side flanges 102a, 102b are shown as rectangular in shape, it is to be understood that the side flanges 102a, 102b can have different shapes such as, but not limited to, rounded flanges, triangular flanges, or the side flanges 102a, 102b can have any other suitable regular or irregular shape.

Various weight lifting accessories, therapeutic accessories, and fitness accessories can be attached to multi-use mounting bracket 100. The accessories can be attached in a number of ways including, for example and without limitation, welding or attachment to a receptacle on the multi-use mounting bracket 100 (e.g., a hook or threaded rod). For example, the extension 110 can be threaded to receive an accessory with a compatible threaded component. As another example, the extension 110 can include one or more features that make it a weight-lifting accessory, a therapeutic accessory, and/or a fitness accessory wherein the extension 110 is welded to the face plate 101. Similarly, the extension 110 can be configured to support an accessory that is placed on and/or around the extension 110, such as a foam roller or other similar cylindrical apparatus. The extension 110 is typically welded to the face plate 101. In addition, the extension 110 can be made of a material similar to the face plate 101 and/or the side flanges 102a, 102b such as steel.

A first side flange 102a forms a plurality of holes 103a, 104a, 105a and a second side flange 102b forms a plurality of corresponding holes 103b, 104b, 105b. Thus, the multi-use mounting bracket 100 forms three pairs of holes: a top pair of holes 103a and 103b, a middle pair of holes 104a and 104b, and a bottom pair of holes 105a and 105b. Each pair of holes can be configured to correspond to perforations on a vertical post of a gym rigging. For example, the top pair of holes 103a and 103b can be configured to correspond to a first gym rigging having a first perforation size and a first vertical post width, the middle pair of holes 104a and 104b can be configured to correspond to a second gym rigging having a second perforation size and a second vertical post width (which may be the same as the first vertical post width), and the bottom pair of holes 105a and 105b can be configured to correspond to a third perforation size (which may be the same as the first perforation size) and a third vertical post width. Accordingly, the multi-use mounting bracket 100 can be configured to be secured to at least three different vertical post configurations and/or gym rigging configurations.

As described herein, the multi-use mounting bracket 100 can be secured to a particular vertical post using a pin (e.g., a quick detach pin) that is configured for use with the particular vertical post. The pairs of holes 103a, 103b, 104a, 104b, 105a, 105b are configured so that a suitable pin can be used to mount the multi-use mounting bracket 100 to the particular vertical post. In some embodiments, the pairs of holes 103a, 103b, 104a, 104b, 105a, 105b are approximately the same size or slightly larger than the perforations in the gym rigging to which the holes correspond.

The multi-use mounting bracket 100 is configured to be mounted or coupled to a post of a frame structure, the post having perforations on opposite sides of the post. The perforations are typically located on the center line of the post but may be offset from the center line in some instances. The pairs of holes 103a, 103b, 104a, 104b, 105a, 105b are configured to be sized and positioned on the respective side flanges 102a, 102b so that at least one pair of holes (e.g., the top pair of holes 103a and 103b, the middle pair of holes 104a and 104b, or the bottom pair of holes 105a and 105b) are aligned with the perforations on the post so that the multi-use mounting bracket 100 can be secured thereto using a pin or other rod structure, as described in greater detail herein. The holes 103a, 103b, 104a, 104b, 105a, 105b of the multi-use mounting bracket 100 can be positioned on the side flanges 102a, 102b so that securing the multi-use mounting bracket 100 to a post causes the inner face 106 (or a cushion (not shown) attached to the inner face 106) to abut a corresponding external side of the post.

It is to be understood that due to mechanical tolerances, the description herein of the sizes and dimensions of the various elements of the multi-use mounting bracket 100 in comparison with elements of exercise equipment should be understood to allow for distances to exist between the multi-use mounting bracket 100 and a frame structure to which it is mounted. For example, as stated herein, the distance between the side flanges 102a, 102b can be larger than a corresponding side of the frame structure to which it is mounted, wherein that distance is larger than the width or depth of the post by less than or equal to about ¼ inch, less than or equal to about ⅛ inch, less than or equal to about 1/16 inch, less than or equal to about 1/32 inch, or less than or equal to about 1/64 inch.

The multi-use mounting bracket 100 can be configured to fit different frame structures that have at least one dimension that is suitably sized. For example, the multi-use mounting bracket 100 can be configured to fit 2×3 rigging, light weight 3×3 rigging, and heavy weight 3×3 rigging. This is because each configuration of rigging has a dimension that is about 3 inches. As another example, the multi-use mounting bracket 100 can be configured to fit both 2×2 rigging and 2×3 rigging because the multi-use mounting bracket 100 can be configured to fit the 2-inch side of the rigging. This can be accomplished, in some embodiments, by making the width of the inner face 106 slightly larger than the size of the common dimension. Using the example where the common dimension is 2 inches, the width of the inner face 106 (e.g., the distance between the inner sides of the side flanges 102a, 102b) can be larger than about 2 inches and less than or equal to about 2.1 inches. Using the example where the common dimension is 3 inches, the width of the inner face 106 (e.g., the distance between the inner sides of the side flanges 102a, 102b) can be larger than about 3 inches and less than or equal to about 3.1 inches. In addition, the pairs of holes 103a, 103b, 104a, 104b, 105a, 105b can be sized and positioned to correspond to perforations in the sides of such rigging.

The multi-use mounting bracket 100 is configured to resist both upward and downward forces. This may be advantageous for self-massage and therapeutic accessories where a user may apply both upward and downward forces on the accessory to achieve a desired massage or therapeutic effect. In typical brackets or accessories, application of an upward force causes the bracket or accessory to rotate or move upward. This is due at least in part to the typical bracket or accessory being designed to solely support weight (e.g., downward forces).

The multi-use mounting bracket 100 is configured to remain substantially stationary where upward and downward forces are applied due at least in part to the height of the multi-use mounting bracket 100 and/or to the rigid material used. The positioning of the pairs of holes 103a, 103b, and consequently the positioning of a pin inserted through those holes to secure the multi-use mounting bracket 100 to gym rigging, create a fulcrum point around which the multi-use mounting bracket 100 tends to rotate responsive to upward and downward forces. By extending the height of the face plate 101 sufficiently above the center of the pair of holes 103a, 103b, the face plate 101 is configured to apply a sufficient torque to resist a torque that tends to rotate the multi-use mounting bracket 100 upward. As is evident from the equation for torque (e.g., $\tau = F \times r$), a longer lever arm is capable of generating more torque. Accordingly, by lengthening the face plate 101 above the centers of the pair of holes 103a, 103b (e.g., the fulcrum point), the multi-use mounting bracket 100 is configured to withstand upward forces. When an upward force is applied to the multi-use mounting bracket 100, the portion of the face plate 101 that is above the fulcrum point engages the vertical post or gym rigging to prevent or reduce upward movement of the extension 110.

The configuration of the pairs of holes formed by the side flanges 102a, 102b can affect the strength and rigidity of the multi-use mounting bracket 100. The distance between an upper or lower pair of holes (e.g., pairs of holes 103a and 103b or pairs of holes 105a and 105b) and an edge of the face plate 101 and/or the side flanges 102a, 102b can be selected based at least in part on how much space separates the pairs of holes from each other and how that spacing affects the overall strength of the multi-use mounting bracket 100. Furthermore, the distance between an upper or lower pair of holes (e.g., pairs of holes 103a and 103b or pairs of holes 105a and 105b) and an edge of the face plate 101 and/or the side flanges 102a, 102b can be selected based at least in part on the amount of movement allowable or desirable for the multi-use mounting bracket 100 in use. For example, the face plate 101 and/or side flanges 102a, 102b can be extended vertically to reduce movement.

As illustrated, the face plate 101 and the side flanges 102a, 102b have upper and lower edges that are in line with each other and that are level. However, it is to be understood that the face plate 101 can extend past the side flanges 102a, 102b at the top and/or bottom. Furthermore, the face plate 101 can include one or more features that extend vertically (e.g., upward or downward) to increase the strength of the multi-use mounting bracket 100 in use. For example, the face plate 101 can include one or more tabs or rods that extend from the edge of the face plate 101 that are configured to contact a surface of the gym rigging to limit upward and/or downward rotation of the multi-use mounting bracket 100. Similar features can be included on the side flanges 102a, 102b to increase stability of the multi-use mounting bracket 100 in use.

In some embodiments, the multi-use mounting bracket 100 can include a coating or roughened texture on one or more inside surfaces to create additional friction between the multi-use mounting bracket 100 and the rigging to which it is attached. The increased friction can further resist movement of the multi-use mounting bracket 100 when subjected to upward, downward, and/or lateral forces or torques.

Furthermore, the multi-use mounting bracket 100 is configured to fit securely and tightly to a vertical post and/or gym rigging to further increase the stability of the bracket 100. The snugness of the multi-use mounting bracket 100 to the outside walls of the gym rigging give the bracket 100 (and any accessory that is attached to the bracket 100) strength. A gap between the side flanges 102a, 102b and the gym rigging may cause the multi-use mounting bracket 100 to move laterally thereby reducing the rigidity of the bracket and accessory. Accordingly, it is desirable to make the distance between the side flanges 102a, 102b or the width of the inner face 106 to be only slightly larger than the width of the targeted gym rigging to reduce or prevent lateral movement of the multi-use mounting bracket 100.

To further resist upward forces, the face plate 101 and the side flanges 102a, 102b can be made of a rigid material such as steel. In addition, the side flanges 102a, 102b are configured to have a thickness that is sufficient to resist upward, downward, lateral, and/or rotational forces.

The material used for the face plate 101 and the side flanges 102a, 102b can be a metal such as steel. In some embodiments, to manufacture the face plate 101 and the side flanges 102a, 102b with holes 103a, 103b, 104a, 104b, 105a, 105b the material can be drilled, formed and bent in a brake, and deburred. In some embodiments, the extension 110 and/or the gusset 112 is welded to the face plate 101. Accordingly, in such embodiments, the material used for the face plate 101 and the extension 110 is weldable.

In some embodiments, the multi-use mounting bracket 100 can be made of a single piece of plate steel. The pairs of holes 103a, 103b, 104a, 104b, 105a, 105b can be drilled into the plate at the appropriate locations. The plate can then be bent and formed into a rectangular U-shape. This process can result in the pairs of holes 103a, 103b, 104a, 104b, 105a, 105b being aligned with corresponding perforations on targeted gym rigging. The steel plate out of which multi-use mounting bracket 100 may be made can possess characteristics that allow it to be drilled, formed, bent, deburred, and, in some cases, welded. In some implementations, the multi-use mounting bracket may be manufactured using, for example and without limitation, welding, punching, die forming, cutting, and the like. Although a steel plate is described herein for manufacturing the multi-use mounting bracket 100, any suitable material may be used including, for example and without limitation, alloys of steel (e.g., stainless steel), aluminum, and the like. The material can be selected based at least in part on the intended application of the bracket, the targeted weight, strength requirements, environmental factors, cost, or any combination of these.

The multi-use mounting bracket 100 can be used to support gym and therapeutic accessories at a desired height off the ground. This can be advantageous because, for example, when a self-massage accessory is secured to gym rigging off the ground using the multi-use mounting bracket 100 compared to using the self-massage accessory on the ground, a user can more effectively self-massage. This is due at least in part to reducing or eliminating the strength and ability required to get down on the floor to use the self-massage accessory (e.g., a foam roller or a lacrosse ball). In addition, the multi-use mounting bracket 100 can secure a self-massage accessory to gym rigging to enable a user to obtain a more controlled, directed massage from a standing and/or sitting position, which may be preferable to the user. Another advantage is that the multi-use mounting bracket 100 attaches gym and therapeutic accessories to gym rigging thereby securing the accessory to a strong and stable structure to enhance the use of that accessory. Another advantage is that the accessory can be approached from multiple directions because the multi-use mounting bracket 100 supports the accessory away from the gym rigging. This allows the user to freely access and utilize the accessory because there are no interfering structures impeding access to the accessory. Another advantage is that the user has control over placement of the therapeutic accessory and the amount of pressure put on the area of the body which is being worked.

The multi-use mounting bracket 100 can be advantageously configured to attach to three common sizes of commercially available gym rigging without alteration to the bracket. These include, for example and without limitation, 2×3 rigging, light weight 3×3 rigging, and heavy weight 3×3 rigging. Furthermore, the size of the perforations in the three sizes of gym rigging and corresponding quick detach pins may be standardized. Thus, the pairs of holes 103a and 103b, 104a and 104b, and 105a and 105b that are formed by the side flanges 102a, 102b can be sized to match these standard sizes. Accordingly, the multi-use mounting bracket 100 can be beneficial where there is more than one type of rigging. Furthermore, the multi-use mounting bracket 100 can be beneficial where a gym may purchase gym rigging to add to their infrastructure or where a gym may change the type of rigging used as part of an upgrade or remodel.

Because the multi-use mounting bracket 100 supports a variety of accessories, and because the bracket 100 can be attached to different sizes of gym rigging, the bracket 100 may advantageously reduce or eliminate the need to purchase accessories for specific sizes of gym rigging. In many cases a gym owner may only need to acquire one set of accessories for their gym even if all different sizes of rigging are used in the gym. The multi-use mounting bracket 100 may be used in various settings in addition to commercial gyms such as, for example, home gyms, a physical therapist's office, school gyms, and the like. Furthermore, a physical therapist who meets clients in commercial gyms as well as in their office may use the same accessories in both locations using the multi-use mounting bracket 100, even if the commercial gym uses a different size of gym rigging than is used in the therapist's office. Another advantage may be that the use of the multi-use mounting bracket allows for more uniformity in the design, look, and use of accessories across different sizes of gym rigging, which may make the use of such accessories easier, more efficient, and/or more economical.

Figure 2A:
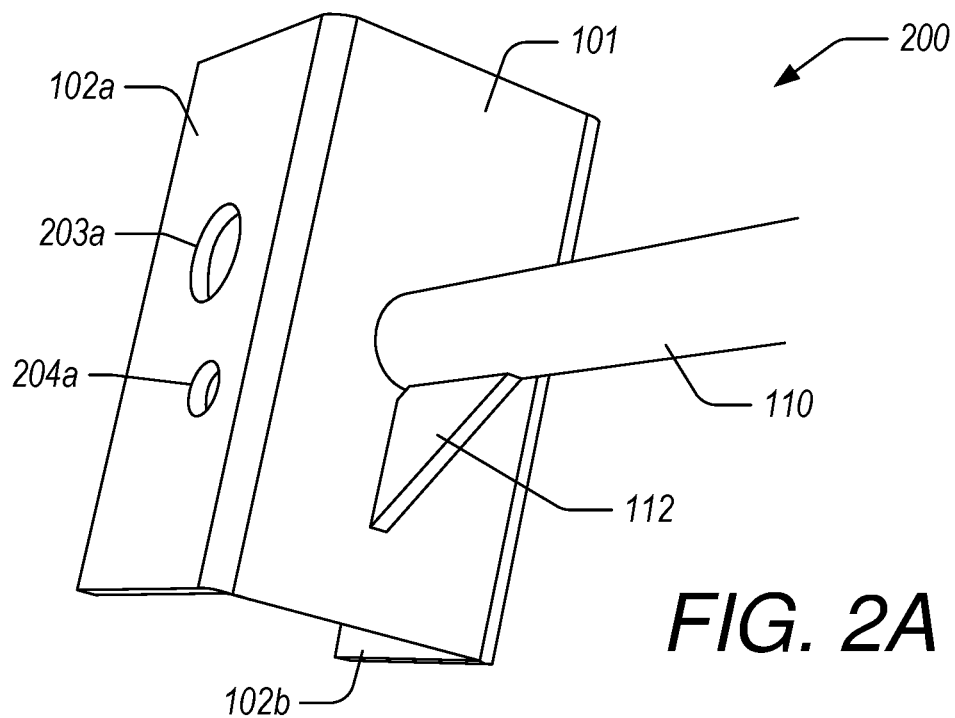
FIGS. 2A and 2B illustrate various views of another example multi-use mounting bracket with an extension for a therapeutic apparatus.
Figure 2B:
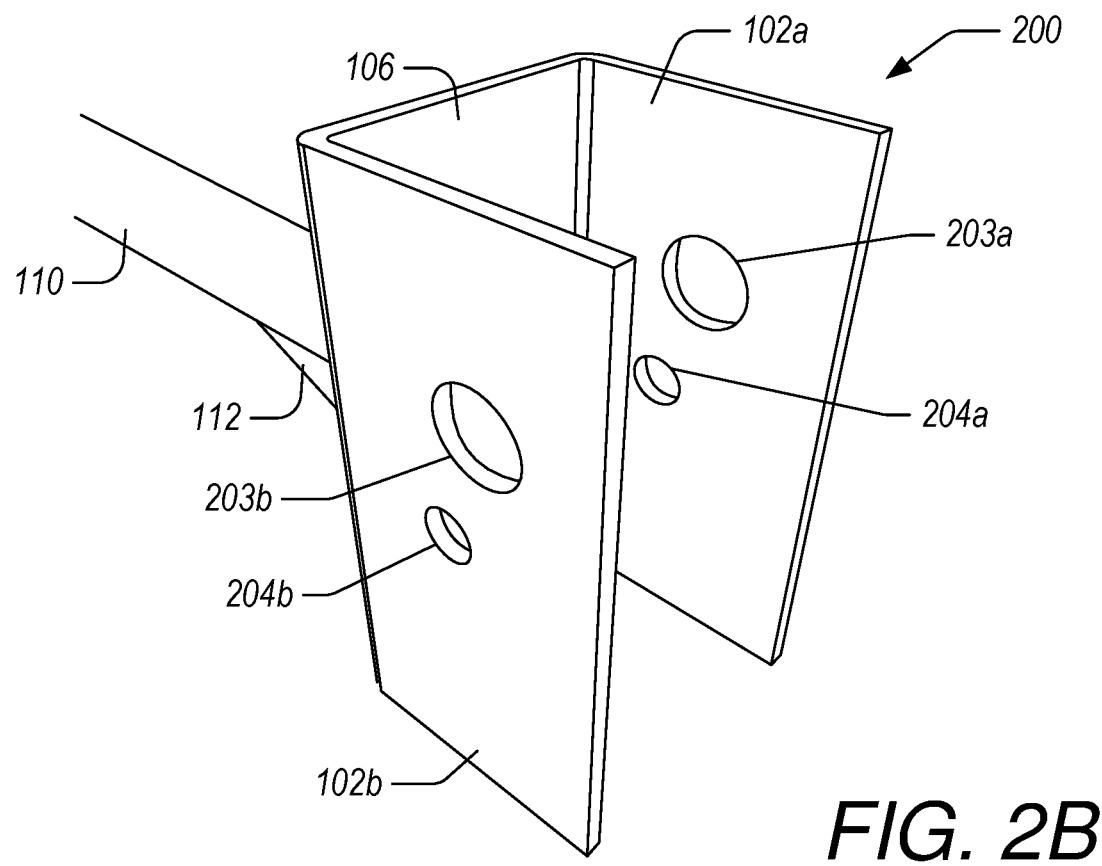

FIGS. 2A and 2B illustrate various views of another example multi-use mounting bracket 200 with an extension 110 for a therapeutic apparatus. The multi-use mounting bracket 200 is similar to the multi-use mounting bracket 100 described herein with reference to FIGS. 1A and 1B, except that the hole configuration is different. Accordingly, the advantages of the multi-use mounting bracket 100 and the description of the common elements and components of the multi-use mounting bracket 100 (indicated using the same reference numbers) apply to the multi-use mounting bracket 200 of FIGS. 2A and 2B.

The first side flange 102a forms a plurality of holes 203a and 204a and the second side flange 102b forms a plurality of corresponding holes 203b and 204b. Thus, the multi-use mounting bracket 200 includes two pairs of holes: a top pair of holes 203a and 203b and a bottom pair of holes 204a and 204b. Each pair of holes can be configured to correspond to perforations on a vertical post of a gym rigging. For example, the top pair of holes 203a and 203b can be configured to correspond to a first gym rigging having a first perforation size and a first vertical post width, and the bottom pair of holes 204a and 204b can be configured to correspond to a second gym rigging having a second perforation size and a second vertical post width.

For example, the top pair of holes 203a and 203b can have a first diameter corresponding to perforations in a first gym rigging configuration and the bottom pair of holes 204a and 204b can have a second diameter different from the first diameter corresponding to perforations in a second gym rigging configuration. Similarly, the top pair of holes 203a and 203b can be positioned a first distance from the face plate 101 to align with perforations in a first gym rigging configuration and the bottom pair of holes 204a and 204b can be positioned a second distance from the face plate 101 (different from the first distance) to align with perforations in a second gym rigging configuration. Moreover, the top pair of holes 203a and 203b can have a first diameter and can be positioned a first distance from the face plate 101 to align with and be appropriately sized for perforations in a first gym rigging configuration and the bottom pair of holes 204a and 204b can have a second diameter different from the first diameter and can be positioned a second distance from the face plate 101 (different from the first distance) to align with and be appropriately sized for perforations in a second gym rigging configuration. Accordingly, the multi-use mounting bracket 200 can be configured to be secured to at least two different vertical post configurations and/or gym rigging configurations.

Figure 3A:
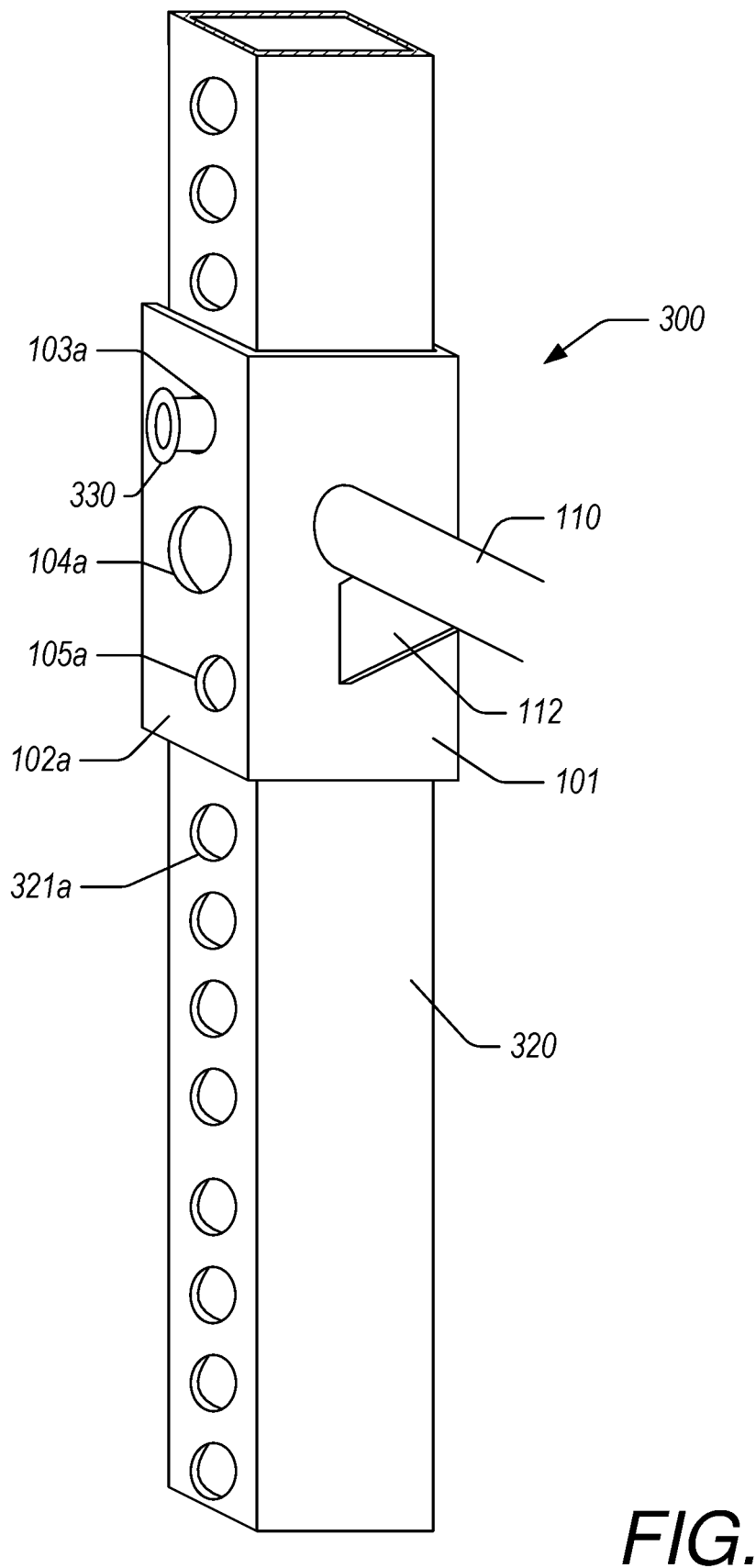
FIGS. 3A and 3B respectively illustrate a perspective view and a cross-section view of an example multi-use mounting bracket with therapeutic extension mounted to exercise equipment with a first hole and post configuration.
Figure 3B:
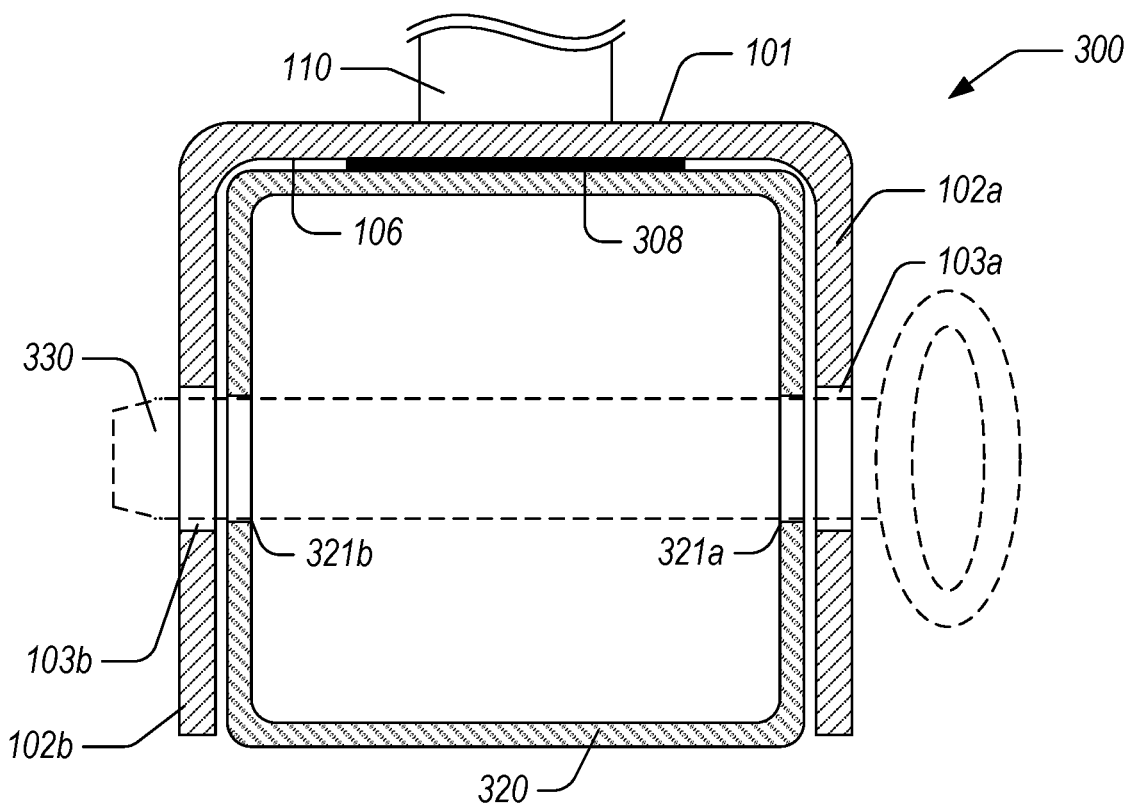

FIGS. 3A and 3B respectively illustrate a perspective view and a cross-section view of an example multi-use mounting bracket 300 with therapeutic extension 110 mounted to a first vertical post 320 having a first hole configuration 321a, 321b corresponding to a first gym rigging configuration. The multi-use mounting bracket 300 is configured similarly to the multi-use mounting bracket 100 described herein with reference to FIG. 1 and like components are indicated using the same reference numbers. Accordingly, a description of these components will not be repeated here.

In the example of FIGS. 3A and 3B, the first gym rigging configuration can correspond to a light weight 3×3 gym rigging wherein the width and length of the sides of the vertical post 320 are about 3 inches and the perforations 321a, 321b are configured to receive a ⅝-inch quick detach pin 330 (e.g., the diameter of the perforations 321a, 321b is slightly larger than about ⅝ inches). However, it is to be understood that these dimensions are purely illustrative and are not intended to be limit the scope of the disclosure.

The multi-use mounting bracket 300 is attached to the first vertical post 320 by contacting the inner face 106 (or a cushion 308 attached to the inner face 106) of the face plate 101 to a side of the post 320 so that the top pair of holes 103a and 103b align with a corresponding pair of perforations 321a and 321b formed by the post 320. The quick detach pin 330 is inserted through the top pair of holes 103a and 103b as well as the corresponding pair of perforations 321a and 321b to secure the multi-use mounting bracket 300 to the post 320.

In some embodiments, the multi-use mounting bracket 300 includes a cushion 308 attached to the inner face 106 of the face plate 101. In such embodiments, the cushion 308 contacts the post 320 during use. The cushion 308 can be any suitable pliable material that is configured to compress in response to pressure. The cushion 308 can be configured to reduce and/or distribute the forces between the inner face 106 and the post 320. This can improve the coupling between the post 320 and the multi-use mounting bracket 300. For example, the cushion 308 can compensate for differences between posts and brackets that arise due to manufacturing tolerances. As another example, the cushion 308 can apply an outward pressure on the inner face 106 and the post 320 making the attachment more secure. As another example, the cushion 308 may reduce rattling that arise where there is a gap between the vertical post 320 and the inner face 106. Although not shown, similar cushions may be used on inner faces of the side flanges 102a, 102b to provide similar advantages. In some embodiments, the cushion 308 includes one or more rubber sheets attached to the inner face 106. The total thickness of the cushion can be less than or equal to about ⅛ inch. In some embodiments, the cushion 308 includes two pads glued on top of each other, with a first pad affixed to the inner face 106 and a second pad affixed to the first pad, the second pad being smaller than the first pad.

Figure 3C:
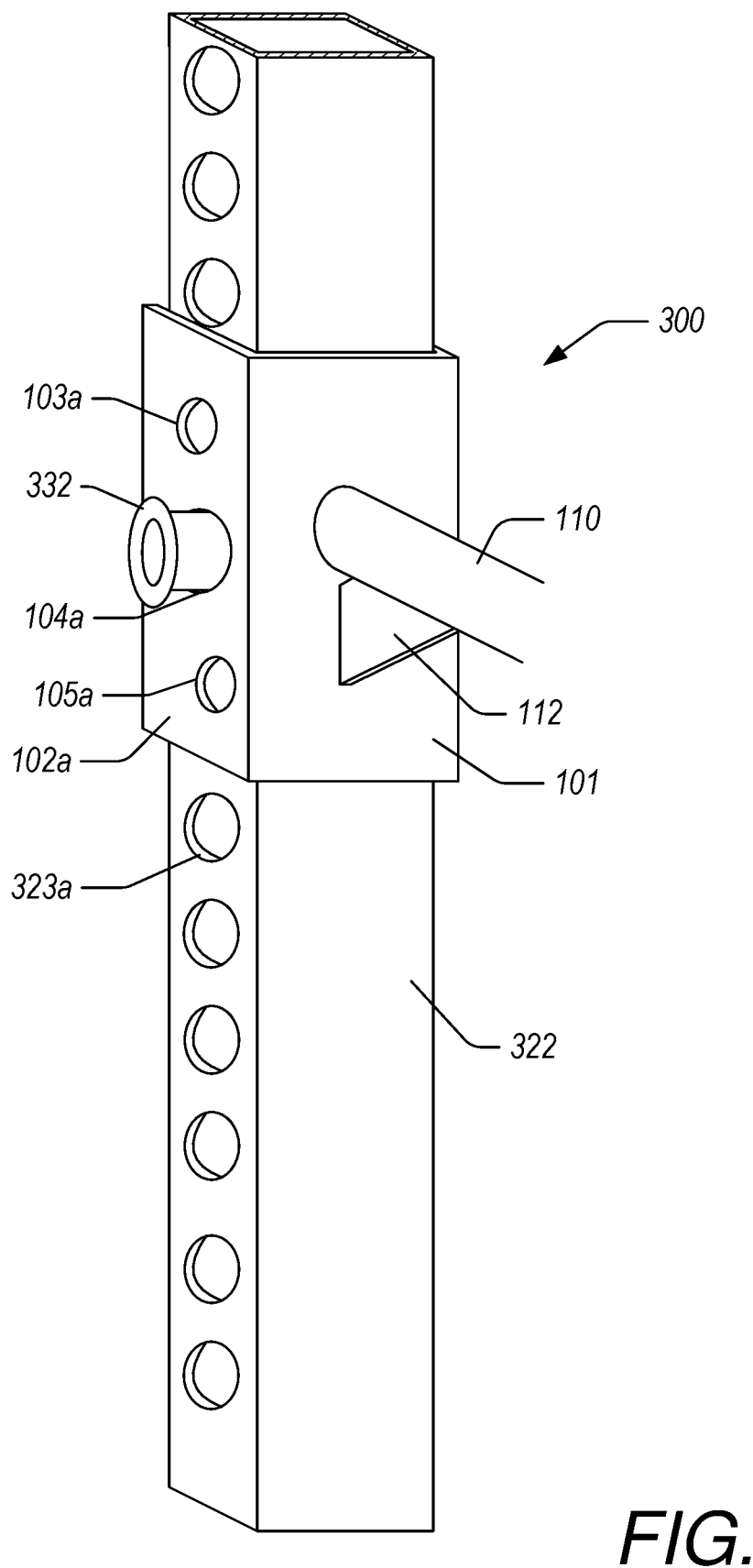
FIGS. 3C and 3D respectively illustrate a perspective view and a cross-section view of an example multi-use mounting bracket with therapeutic extension mounted to exercise equipment with a second hole and post configuration.
Figure 3D:
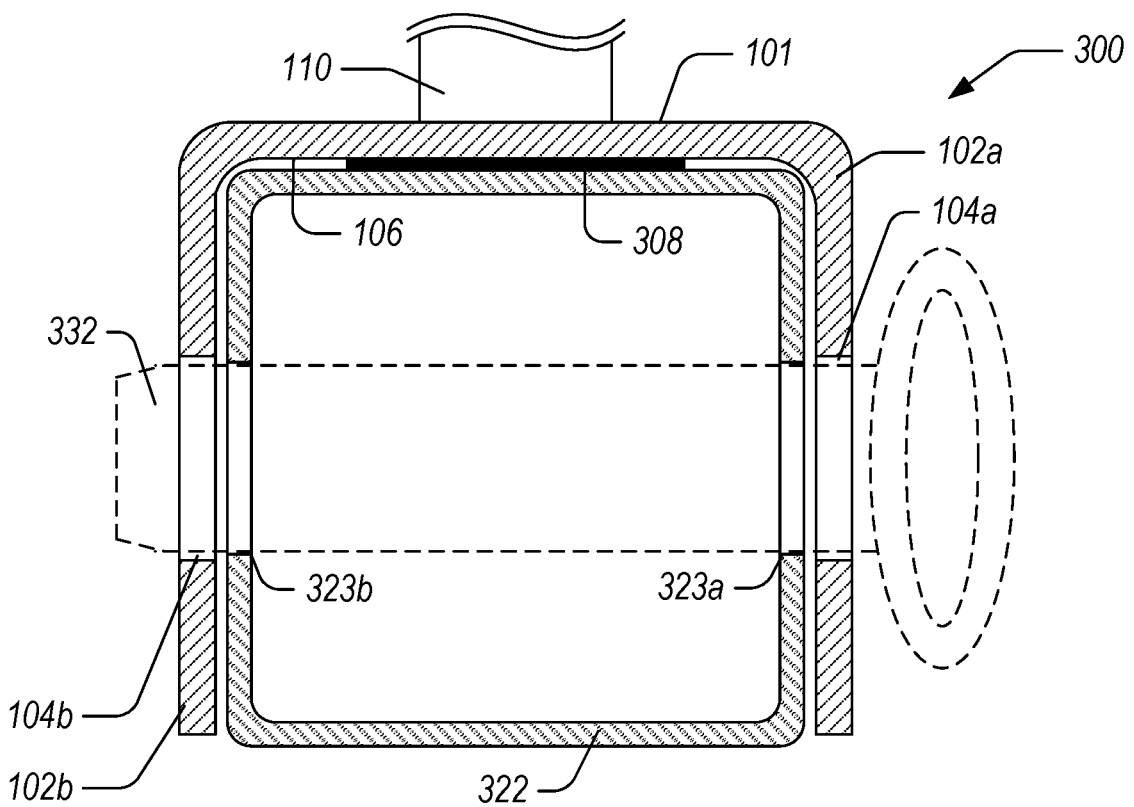

FIGS. 3C and 3D respectively illustrate a perspective view and a cross-section view of the multi-use mounting bracket 300 mounted to a second vertical post 322 having a second hole configuration 323a, 323b corresponding to a second gym rigging configuration. In the example of FIGS. 3C and 3D, the second gym rigging configuration can correspond to a heavy weight 3×3 gym rigging wherein the width and length of the sides of the vertical post 322 are about 3 inches and the perforations 323a, 323b are configured to receive a 1-inch quick detach pin 332 (e.g., the diameter of the perforations 323a, 323b is slightly larger than about 1 inch). However, it is to be understood that these dimensions are purely illustrative and are not intended to be limit the scope of the disclosure.

The multi-use mounting bracket 300 is attached to the second vertical post 322 by contacting the inner face 106 (or a cushion 308 attached to the inner face 106) of the face plate 101 to a side of the post 322 so that the middle pair of holes 104a and 104b align with a corresponding pair of perforations 323a and 323b formed by the post 322. The quick detach pin 332 is inserted through the middle pair of holes 104a and 104b as well as the corresponding pair of perforations 323a and 323b to secure the multi-use mounting bracket 300 to the post 322.

Figure 3E:
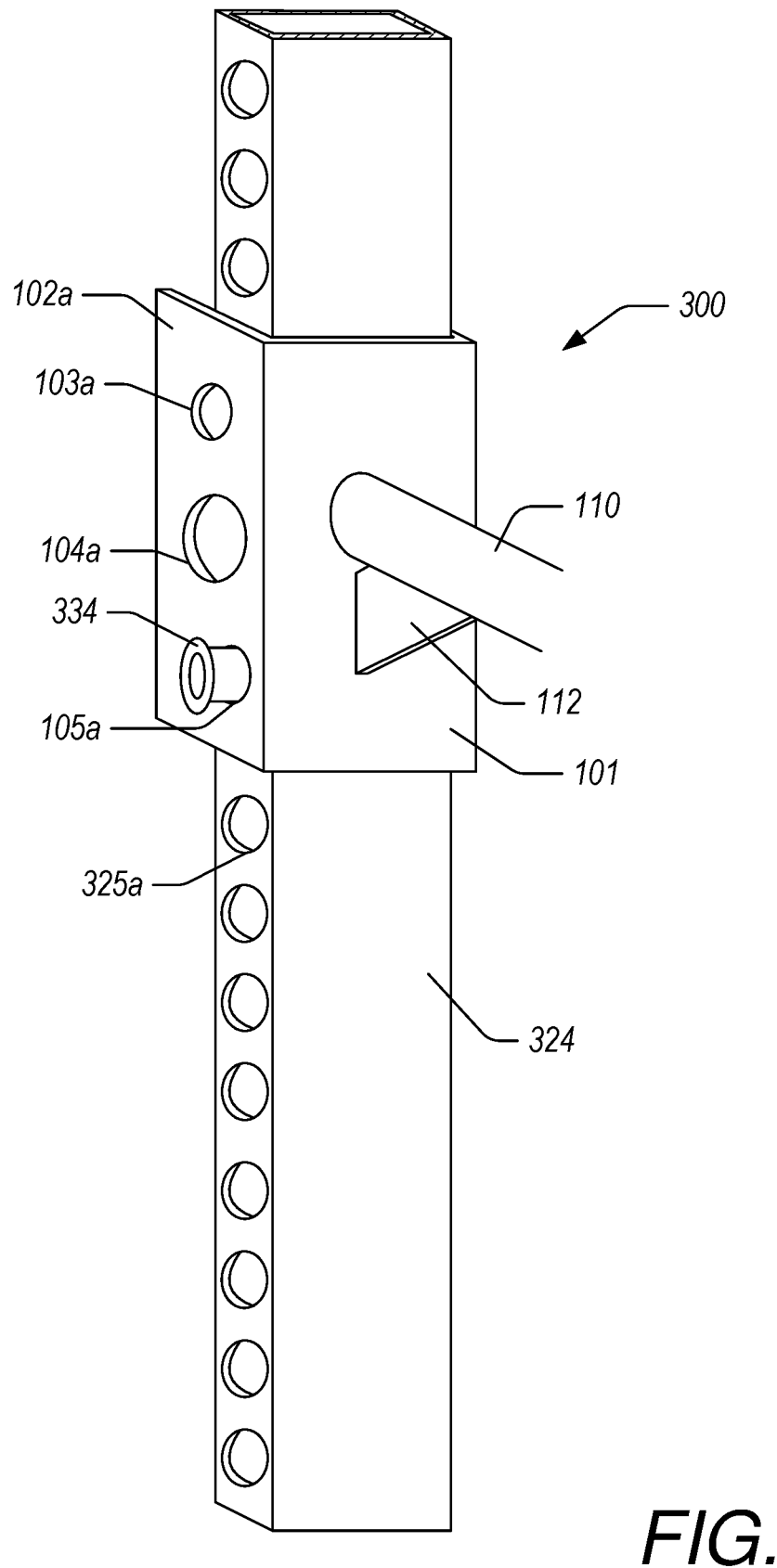
FIGS. 3E and 3F respectively illustrate a perspective view and a cross-section view of an example multi-use mounting bracket with therapeutic extension mounted to exercise equipment with a third hole and post configuration.
Figure 3F:
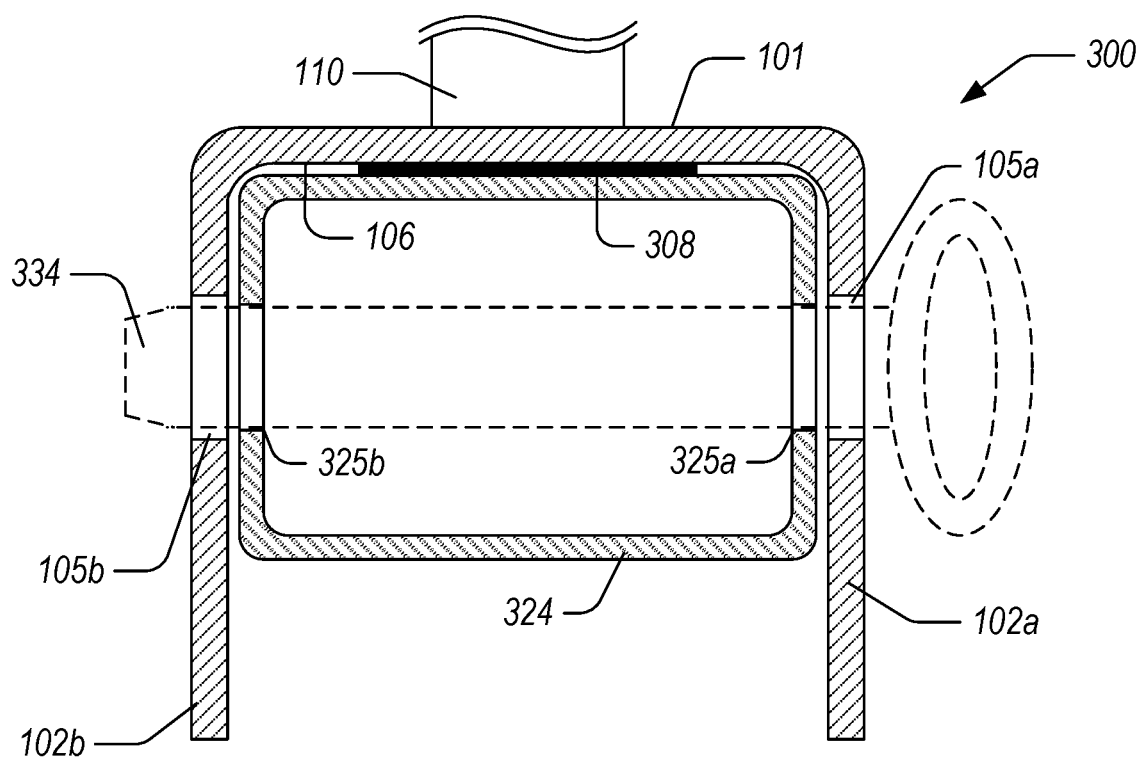

FIGS. 3E and 3F respectively illustrate a perspective view and a cross-section view of the multi-use mounting bracket 300 mounted to a third vertical post 324 having a third hole configuration 325a, 325b corresponding to a third gym rigging configuration. In the example of FIGS. 3E and 3F, the third gym rigging configuration can correspond to a 2×3 gym rigging wherein the width of the sides of the vertical post 324 are about 3 inches, the length of the sides with the perforations 325a, 325b of the vertical post 324 are about 2 inches, and the perforations 325a, 325b are configured to receive a ⅝-inch quick detach pin 334 (e.g., the diameter of the perforations 325a, 325b is slightly larger than about ⅝ inches). However, it is to be understood that these dimensions are purely illustrative and are not intended to be limit the scope of the disclosure. The first, second, and third gym rigging configurations have a common dimension that corresponds to a width of the inner face 106. Thus, the multi-use mounting bracket 300 is configured to be securely attached to three different gym rigging configurations.

The multi-use mounting bracket 300 is attached to the third vertical post 324 by contacting the inner face 106 (or the cushion 308 attached to the inner face 106) of the face plate 101 to a side of the post 324 so that the bottom pair of holes 105a and 105b align with a corresponding pair of perforations 325a and 325b formed by the post 324. The quick detach pin 334 is inserted through the bottom pair of holes 105a and 105b as well as the corresponding pair of perforations 325a and 325b to secure the multi-use mounting bracket 300 to the post 324.

Figure 4:
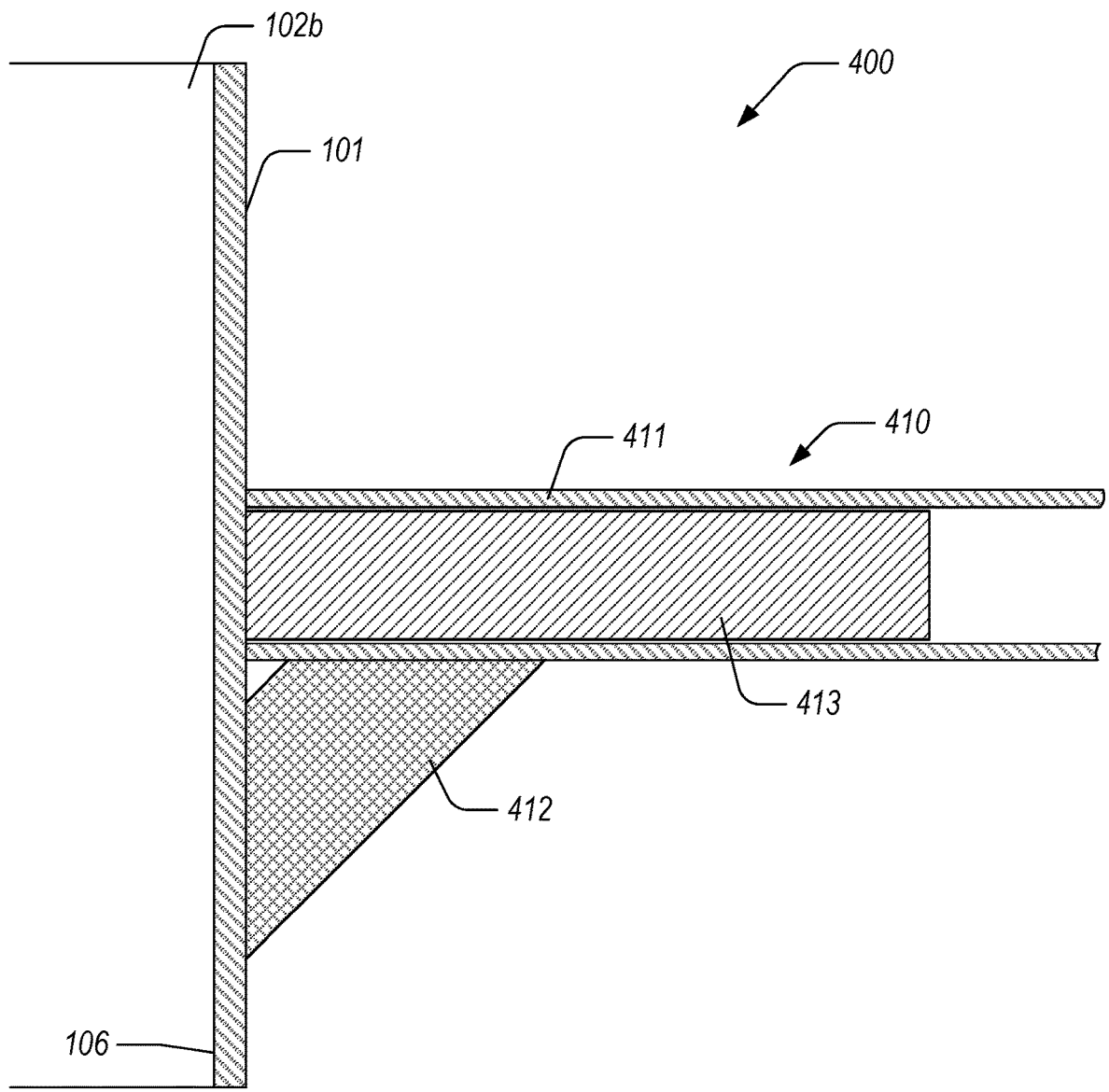
FIG. 4 illustrates a cross-section view of another example multi-use mounting bracket having an internal support rod and an extension tube attached to the bracket.

FIG. 4 illustrates a cross-section view of another example multi-use mounting bracket 400 having an internal support rod 413 and an extension tube 411 attached to the bracket to form an extension 410. This configuration can increase the strength of the extension 410, allowing it to support higher forces and torques without breaking or detaching from the face plate 101. The multi-use mounting bracket 400 also includes a gusset 412 similar to the gusset 112 described herein with respect to FIGS. 1A-3F. In some embodiments, the combination of the support rod 413 and the gusset 412 strengthens the multi-use mounting bracket 400 making it capable of supporting the weight of an athlete weighing three hundred pounds or more. The extension 410 is similar in form and functionality to the extension 110 described herein with respect to FIGS. 1 and 2 and the extension 110 can be configured to include a support rod and extension tube as described with respect to the extension 410 of FIG. 4.

The support rod 413 can be configured to have a radius that is approximately the same but smaller than an inner radius of the extension tube 411 so that there is little or no space between an exterior surface of the support rod and an interior surface of the extension tube 411. The support rod 413 can be attached to the face plate 101 through any suitable means including by welding. In some embodiments, the extension tube 411 can be welded to the face plate 101 and then the extension tube 411 can be fitted over the support rod 413 and welded to the face plate as well. The support rod 413 can prevent or reduce the likelihood that the extension tube 411 bends or breaks at the weld. A gusset 412 is attached to the face plate 101 and to the extension tube 411 to further increase the rigidity and strength of the extension 410. In some embodiments, a high-strength nut can be welded to the distal end of the extension tube 411 to become a receptacle for a threaded accessory to be attached to the multi-use mounting bracket 400.

The support rod 413 can have a length extending from the face plate 101 that is less than or equal to the length of the extension tube 411. In some embodiments, the support rod 413 can have a length that is less than or equal to about 4 inches. The support rod 413 can be a high-strength steel tube. Although the support rod 413 is described as a cylinder, the support rod 413 can be of any suitable configuration to provide support to the extension tube 411. Similarly, although the extension tube 411 is described as a hollow cylinder, the extension tube 411 can be of any suitable configuration to support an accessory of the multi-use mounting bracket 400.

Figure 5A:
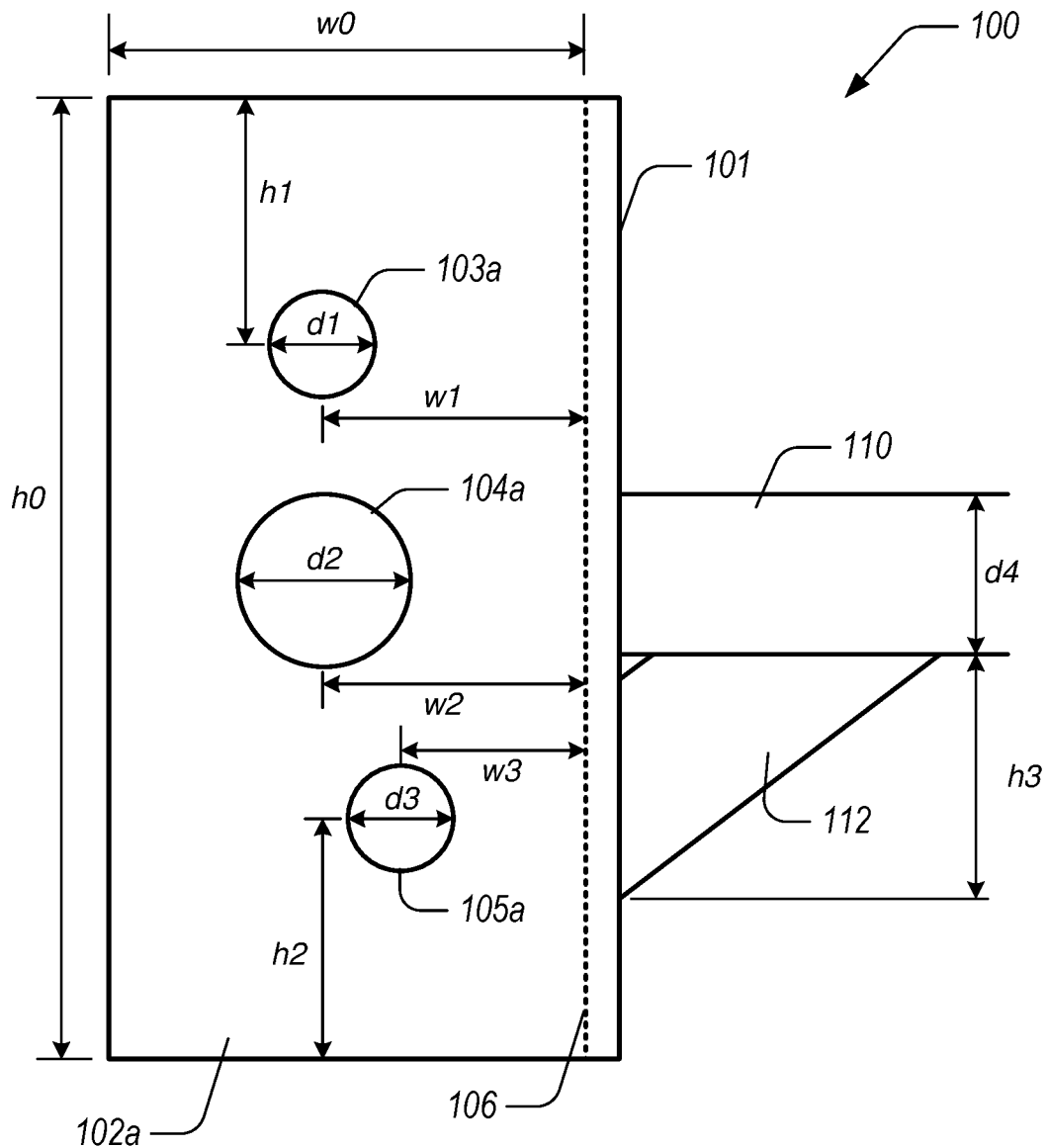
FIGS. 5A and 5B illustrate respective side and top views of an example multi-use mounting bracket having a therapeutic apparatus extension to illustrate various dimensions thereof.
Figure 5B:
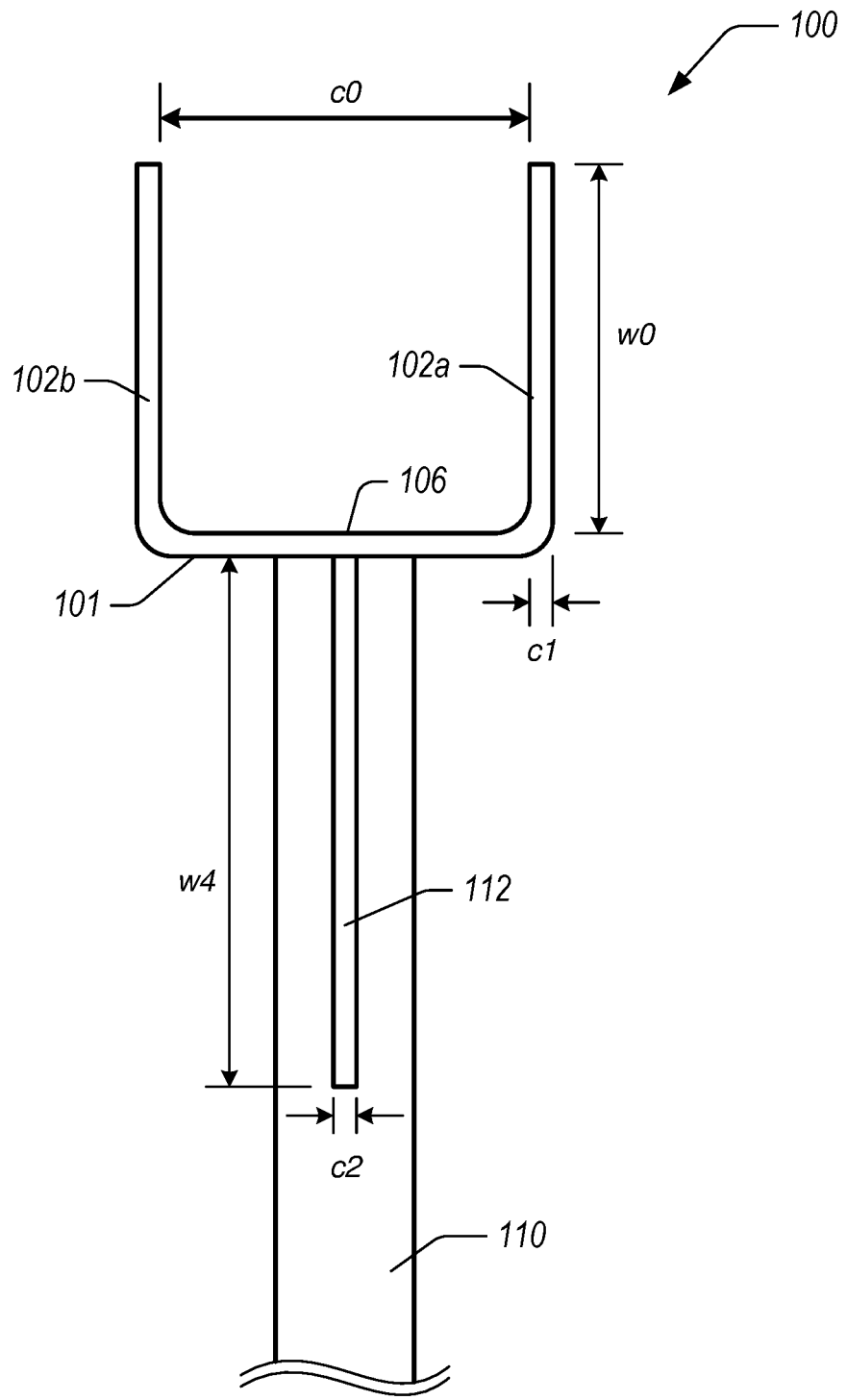

FIGS. 5A and 5B illustrate respective side and top views of the multi-use mounting bracket 100 of FIGS. 1A and 1B having a therapeutic apparatus extension 110 to illustrate examples of various dimensions thereof. The dimensions provided herein are intended to serve as examples of embodiments of the multi-use mounting bracket 100 and are not intended to limit the scope of the disclosure. Similar dimensions can apply to the multi-use mounting bracket 200 of FIGS. 2A and 2B. For example, the diameters and placement of the holes formed by the side flanges 102a, 102b can be similar between the multi-use mounting bracket 100 of FIGS. 1A and 1B and the multi-use mounting bracket 200 of FIGS. 2A and 2B.

The height of the face plate 101 (height h0) can be about 6 inches. In some embodiments, the height h0 can be at least 5 inches and/or less than or equal to about 9 inches, at least 5.5 inches and/or less than or equal to about 7 inches, or at least 5.75 inches and/or less than or equal to about 6.5 inches. The distance from the top of the face plate 101 and/or side flange 102a to the top hole 103a (height h1) can be about 1.5 inches. Similarly, the distance from the bottom of the face plate 101 and/or side flange 102a to the bottom hole 105a (height h2) can be about 1.5 inches. In some embodiments, the heights h1 and/or h2 can be at least 0.75 inches and/or less than or equal to about 2.5 inches, at least 1 inch and/or less than or equal to about 2 inches, at least 1.25 inches and/or less than or equal to about 1.75 inches. In some embodiments, the distance from the bottom or top of the face plate 101 to the center of the middle hole 104a is approximately halfway between the top hole 103a and the bottom hole 105a and/or halfway between the top and bottom of the side flange 102a. However, the placement of the middle hole 104a can vary and need not be in the middle of the side flange 102a or halfway between the top hole 103a and the bottom hole 105a.

The heights h1 and h2 can be configured to support the multi-use mounting bracket 100 in the presence of upward and downward forces, as described herein. For example, the heights h1 and h2 can be configured to provide a suitable distance from a fulcrum point defined by the top hole 103a or the bottom hole 105a (depending on where the pin is inserted) to resist upward and/or downward forces so that the multi-use mounting bracket 100 remains substantially stationary in the presence of such forces. Accordingly, the heights h1 and/or h2 can be longer than the example dimensions listed herein to increase resistance to forces or the heights h1 and/or h2 can be shorter than the example dimensions listed herein where resistance to forces is less important or where relatively small forces are expected.

The distance from the inner face 106 to the proximal edge of the side flange 102a, width w0, is about 2⅝ inches. The width w0 can be configured to support the multi-use mounting bracket 100 in the presence of lateral forces, as described herein. For example, the width w0 can be configured to provide a suitable distance from a fulcrum point defined by the top hole 103a, the middle hole 104a, or the bottom hole 105a (depending on where the pin is inserted) to resist lateral forces so that the multi-use mounting bracket 100 remains substantially stationary in the presence of such forces. The distance from the inner face 106 to the center of the top hole 103a, width w1, is about 1.5 inches. The distance from the inner face 106 to the center of the middle hole 104a, width w2, is about 1.5 inches. The distance from the inner face 106 to the center of the bottom hole 105a, width w3, is about 1 inch.

The diameters of the holes 103a, 104a, 105a can be configured to be slightly larger than a pin (e.g., a quick detach pin) used to secure equipment to gym rigging. Common sizes of pins include ½-inch pins, ⅝-inch pins, and 1-inch pins, but other sizes are possible and are included within the scope of this disclosure. The diameter of a hole configured to be compatible with ⅝-inch pins can be about 11/16 inches, or at least about ⅝ inches and/or less than or equal to about ⅞ inches. Similarly, the diameter of a hole configured to be compatible with 1-inch pins can be about 1 1/16 inches, or at least about 1 inch and/or less than or equal to about 1⅛ inches. Furthermore, the diameter of a hole configured to be compatible with ½-inch pins can be about 9/16 inches, or at least about ½ inches and/or less than or equal to about 11/16 inches.

By way of example, the top hole 103a and the bottom hole 105a can be configured to be compatible with ⅝-inch hardware and the middle hole 104a can be configured to be compatible with 1-inch hardware. Accordingly, the diameter of the top hole 103a, diameter d1, can be about 11/16 inches; the diameter of the middle hole 104a, diameter d2, can be about 1 1/16 inches; and the diameter of the bottom hole 105a, diameter d3, can be about 11/16 inches. For each hole (or, more accurately, pair of holes), the combination of the diameter and the distance from the inner face 106 is configured to be compatible with perforations of a particular gym rigging configuration.

The width of the inner face 106, width c0, can be configured to be slightly larger than a corresponding width of vertical posts in gym riggings with a common dimension (e.g., 3 inches for 2×3 rigging and 3×3 rigging or 2 inches for 2×2 rigging and 2×3 rigging). By way of example, to fit rigging with a common dimension of 3 inches, the width of the inner face 106, width c0, can be about 3 1/8 inches. In some embodiments, the width C0 can be at least 3 inches and/or less than or equal to about 3 1/2 inches, at least 3 1/16 inches and/or less than or equal to about 3 1/4 inches, or at least 3 3/32 inches and/or less than or equal to about 3 3/16 inches. This embodiment of the multi-use mounting bracket 100 can be configured to attach to light weight 3×3 rigging, heavy weight 3×3 rigging, and 2×3 rigging. The width C0 of the inner face 106 is configured to be substantially the same as, and slightly larger than, the width of the common dimension of the posts: the width C0 of the inner face 106 is about 3 1/8 inches to be secured against a vertical post that is about 3 inches wide.

Continuing the example, light weight 3×3 gym rigging has a width of about 3 inches with perforations having a diameter of about 21/32 inches configured to receive a 5/8-inch quick detach pin. Accordingly, the top hole 103a (or the top pair of holes 103a, 103b) has a diameter d1 of about 11/16 inches and a distance w/from the inner face 106 of about 1.5 inches so that, when the multi-use mounting bracket 100 is attached to a light weight 3×3 gym rigging, the top pair of holes 103a, 103b is aligned with the perforations in the rigging. Also, the diameter d1 of the top pair of holes 103a, 103b is slightly larger than the 5/8-inch quick detach pin so that the quick detach pin can be inserted through the holes in the bracket 100 and the perforations of the rigging.

Continuing the example, heavy weight 3×3 gym rigging has a width of about 3 inches with perforations having a diameter of about 1 1/32 inches configured to receive a 1-inch quick detach pin. Accordingly, the middle hole 104a (or the middle pair of holes 104a, 104b) has a diameter d2 of about 1 1/16 inches and a distance w2 from the inner face 106 of about 1.5 inches so that, when the multi-use mounting bracket 100 is attached to a heavy weight 3×3 gym rigging, the middle pair of holes 104a, 104b is aligned with the perforations in the rigging. Also, the diameter d2 of the middle pair of holes 104a, 104b is slightly larger than the 1-inch quick detach pin so that the quick detach pin can be inserted through the holes in the bracket 100 and the perforations of the rigging.

Continuing the example, 2×3 gym rigging has a side with a width of about 2 inches with perforations having a diameter of about 21/32 inches configured to receive a 5/8-inch quick detach pin. Accordingly, the bottom hole 105a (or the bottom pair of holes 105a, 105b) has a diameter d3 of about 11/16 inches and a distance w3 from the inner face 106 of about 1 inch so that, when the multi-use mounting bracket 100 is attached to a 2×3 gym rigging with the inner face 106 abutting the side of the vertical post with a width of 3 inches, the bottom pair of holes 105a, 105b is aligned with the perforations in the rigging. Also, the diameter d3 of the bottom pair of holes 105a, 105b is slightly larger than the 5/8-inch quick detach pin so that the quick detach pin can be inserted through the holes in the bracket 100 and the perforations of the rigging.

For increased resilience to forces, the side flanges 102a, 102b and face plate 101 of the multi-use mounting bracket 100 can be made of a single piece of metal (e.g., a steel plate that is bent into the rectangular U-shape). The thickness of the plate, thickness c1, can be about 3/16 inches (e.g., 3/16-inch plate steel), at least about 1/8 inches and/or less than or equal to about 1/4 inches, or at least about 5/32 inches and/or less than or equal to about 7/32 inches. It is to be understood that the multi-use mounting bracket 100 need not be constructed from a single piece of metal but can be manufactured using multiple pieces that are joined together, e.g., through welding.

The extension 110 of the multi-use mounting bracket 100 can be a cylinder having an outer diameter, diameter d4, of about 1 inch. In some embodiments, the extension 110 can be a hollow cylinder with an inner diameter of about 3/4 inches. The length of the extension 110 can be at least about 4 inches and/or less than or equal to about 30 inches, at least about 8 inches and/or less than or equal to about 24 inches, at least about 12 inches and/or less than or equal to about 22 inches, or at least about 18 inches and/or less than or equal to about 20 inches.

The gusset 112 of the multi-use mounting bracket 100 can be a triangular piece of metal that is affixed to the face plate 101 and to the extension 110. The gusset 112 can extend along the face plate 101 about 2 inches below the extension 110 (i.e., the height h3 is about 2 inches). In some embodiments, the height h3 is at least about 1 inch and/or less than or equal to about 3 inches, at least about 1 1/2 inches and/or less than or equal to about 2 1/2 inches, or at least about 1 3/4 inches and/or less than or equal to about 2 1/4 inches. The gusset 112 can extend along the extension 110 about 2 inches from the face plate 101 (i.e., the length w4 is about 2 inches). In some embodiments, the length w4 is at least about 1 inch and/or less than or equal to about 3 inches, at least about 1 1/2 inches and/or less than or equal to about 2 1/2 inches, or at least about 1 3/4 inches and/or less than or equal to about 2 1/4 inches. The height h3 and the length w4 need not be the same and can be different from one another. The gusset 112 can have a thickness c2 of about 1/4 inches. In some embodiments, the thickness c2 is at least about 1/8 inches and/or less than or equal to about 1/2 inches or at least about 3/16 inches and/or less than or equal to about 3/8 inches.

It is to be understood that the total width w0 of the side flanges 102a, 102b can be varied substantially. Furthermore, there is also considerable latitude in where the holes are placed on the side flanges 102a, 102b as long as each pair of holes aligns with corresponding perforations in targeted configurations of gym rigging. The diameter of each pair of holes is configured to match the perforations of the targeted gym rigging configurations.

The multi-use mounting bracket 200 of FIGS. 2A and 2B can be constructed using the same or similar dimensions described herein. For example, the multi-use mounting bracket 200 can be similar to the multi-use mounting bracket 100 with the top pair of holes 103a, 103b removed, the middle pair of holes 104a, 104b removed, or the bottom pair of holes 105a, 105b removed. In such cases, the total height, height h0, can be reduced while the distances h1 and h2 can be approximately the same to resist upward and downward forces.

The multi-use mounting bracket 100 and/or the multi-use mounting bracket 200 can be configured to attach to gym rigging with a common dimension that is different than the 3-inch vertical post example described above. In such configurations, the width of the inner face 106, width c0, can be slightly larger than the common dimension and can be, for example, at least about 1% larger than the common dimension and/or less than or equal to about 10% larger than the common dimension, at least about 2% larger than the common dimension and/or less than or equal to about 7.5% larger than the common dimension, or at least about 3% larger than the common dimension and/or less than or equal to about 5% larger than the common dimension. In such embodiments, the placement of the pairs of holes is configured to be adjusted to align with perforations in the gym rigging (e.g., usually aligned on a center line of the vertical post).

For example, a multi-use mounting bracket (such as the multi-use mounting bracket 100 or 200) that is configured to attach to 2×2 rigging and 2×3 rigging can have the width C0 of the inner face 106 be about 2⅛ inches with the center of a first pair of holes being about 1 inch from the inner face 106 and a second pair of holes being about 1.5 inches from the inner face 106. The diameters of the holes can be configured for the hardware associated with the rigging (e.g., ½-inch pins, ⅝-inch pins, 1-inch pins, etc.).

FIGS. 6A, 6B, 6C, 6D, 6E, and 6F illustrate an example multi-use mounting bracket 600 with an extension 610 that is configured to receive various therapeutic devices. The multi-use mounting bracket 600 includes an extension 610 having a threaded receptacle 615 at a distal end of the extension 610. The extension 610 is supported by a gusset 612 that is similar to the gussets 112 and/or 412 described herein with respect to FIGS. 1A-5B. The extension 610 includes a support rod 613 that is similar to the support rod 413 described herein with reference to FIG. 4. The extension 610 can be at least about 18 inches and/or less than or equal to 24 inches in length.

The extension 610 is configured to receive a therapeutic device 640 having a threaded male connector 645 that is compatible with the threaded female receptacle 615. It is to be understood that the threaded male connector can be part of the extension 610 and the female threaded receptacle can be part of the therapeutic device 640. FIGS. 6B and 6C illustrate a ball 640 being secured to the multi-use mounting bracket 600. The ball 640 can apply pressure on person's body for the purposes of self-massage and therapy. FIGS. 6D-6F illustrate that the ball 640 can have different sizes. For example, the ball 640 can be about 2 inches in diameter, about 4 inches in diameter, about 6 inches in diameter, about 9 inches in diameter, etc. Thus, the multi-use mounting bracket 600 advantageously allows a user to interchange accessories, providing the ability to use various sizes for different purposes. For example, a smaller ball 640 applies more pressure to heavily muscled areas, such as the hips and the hip sockets, and a larger ball 640 is gentler on bony areas, such as the spine and scapula. The ball 640 can be metal, plastic, wood, or other hard or rigid material or the ball 640 can be rubber, foam, or other soft or pliable material.

Furthermore, the multi-use mounting bracket 600 advantageously allows the diameter of the attached ball 640 to change and to vary the height at which the ball 640 is supported. The ball 640 can be used to exert substantial pressure on a specified area of the body. For a therapist to exert the same amount of pressure may require substantial effort. However, when an athlete or other user leans up against the ball 640 attached to gym rigging using the multi-use mounting bracket 600, the athlete can create the desired pressure with little or no effort on the part of the therapist or the athlete. The diameter of the ball 640 is inversely proportional to the concentration of pressure. For example, with a smaller diameter, the ball 640 can exert a greater concentration of pressure into a small area. A 2-inch diameter ball 640 may be useful in penetrating through large muscle groups such as the muscles of the hip and waist to reach the interior of the hip socket. The same 2-inch diameter ball 640 can be positioned close to the ground to massage the feet. When more gentle pressures are desired, a ball 640 with a larger diameter can be used. For instance, a 4-inch ball 640 can apply a desired amount of pressure for the muscles of the neck and the upper back and a 6-inch ball 640 can apply a gentler pressure desirable for the areas surrounding the spine.

Figure 7:
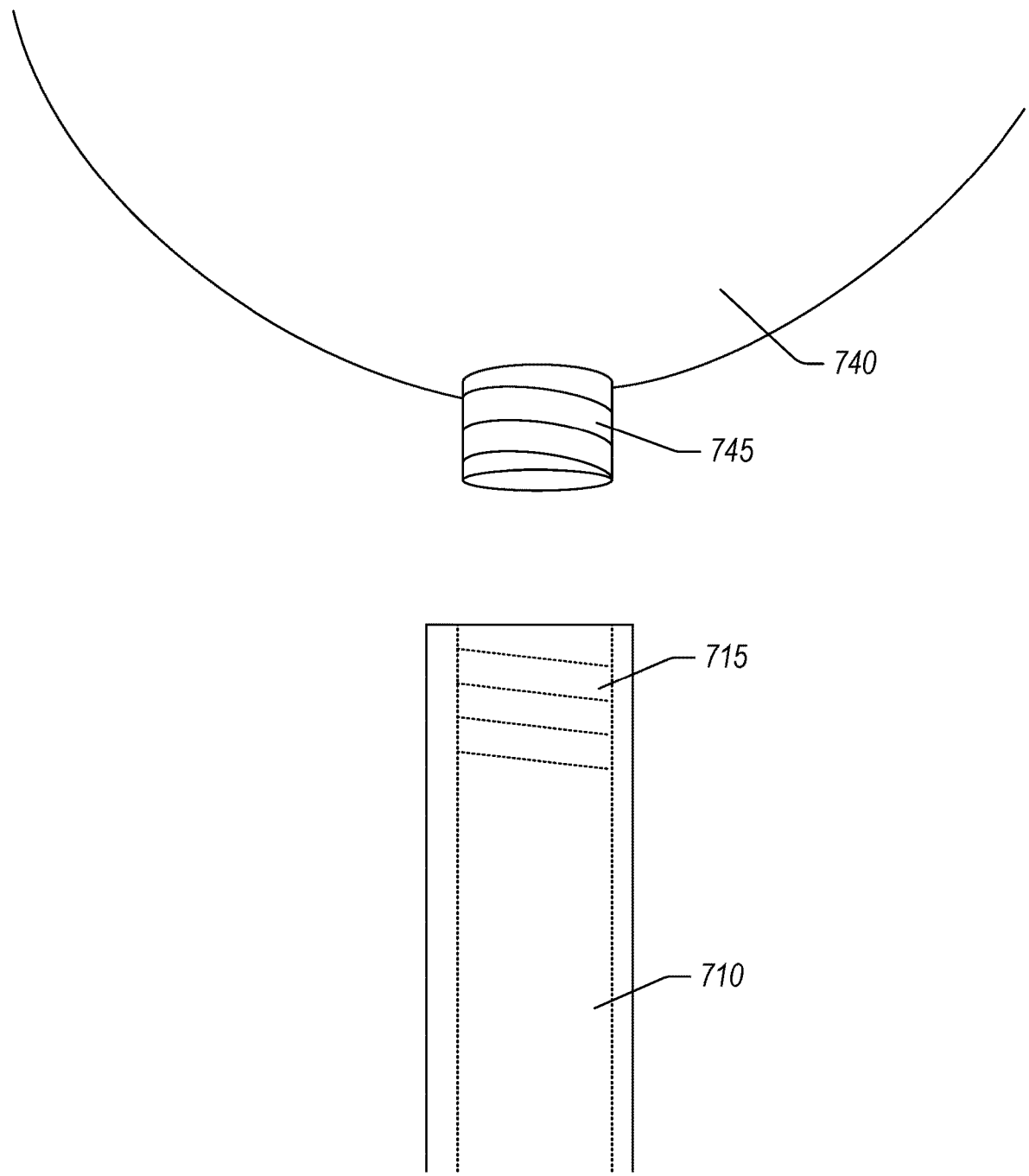
FIG. 7 illustrates a distal end of an example extension for a therapeutic apparatus configured to secure a therapeutic apparatus thereto.

FIG. 7 illustrates a distal end of an example extension 710 of a multi-use mounting bracket that is configured to secure a therapeutic apparatus 740 thereto. The distal end of the extension 710 includes a threaded receptacle 715 formed within the extension 710. The therapeutic apparatus 740 includes a threaded male connector 745 configured to attach to the distal end of the extension 710. The threaded connection can securely attach the therapeutic apparatus 740 to the extension 710.

The extension 710 can be a hollow cylinder with a threaded nut welded to an interior of the hollow cylinder to create the threaded receptacle 715. In some embodiments, the threaded receptacle 715 can be machined into the interior portion of the distal end of the extension 710. Other mechanisms can be used for securing the therapeutic apparatus 740 to the extension 710. For example, the therapeutic apparatus 740 can be secured to the extension 710 using a friction fit, clamps, pins and perforations, and the like.

Figure 8:
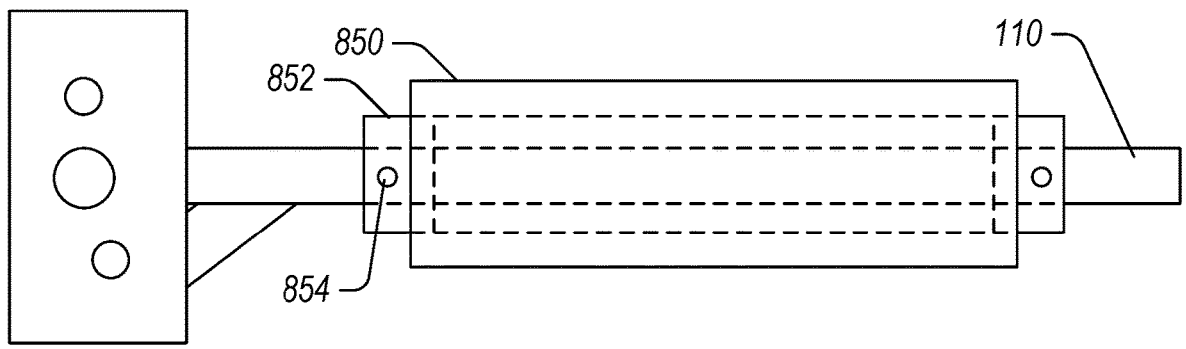
FIG. 8 illustrates an example multi-use mounting bracket with a rigid cylinder secured to an extension of the multi-use mounting bracket.
Figure 9:
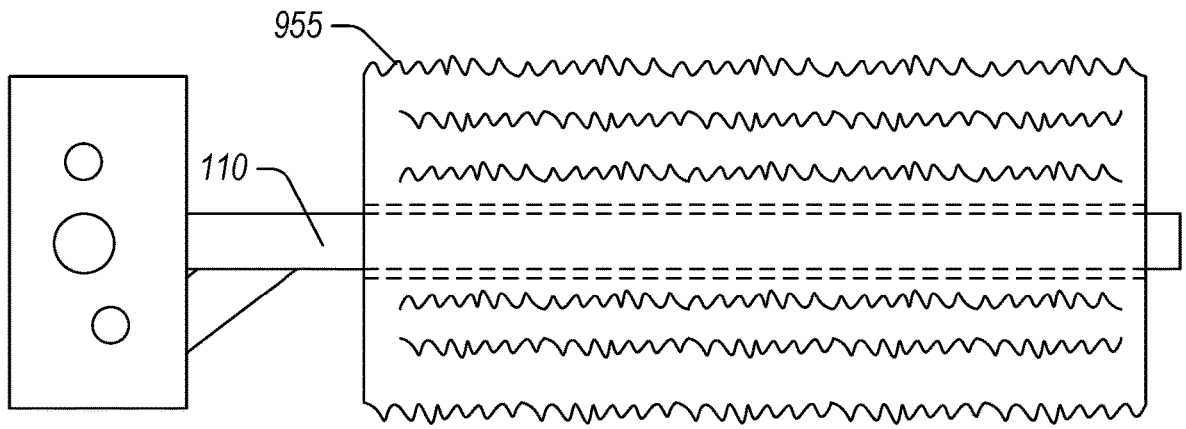
FIG. 9 illustrates an example multi-use mounting bracket with a foam roller supported by an extension of the multi-use mounting bracket.
Figure 10:
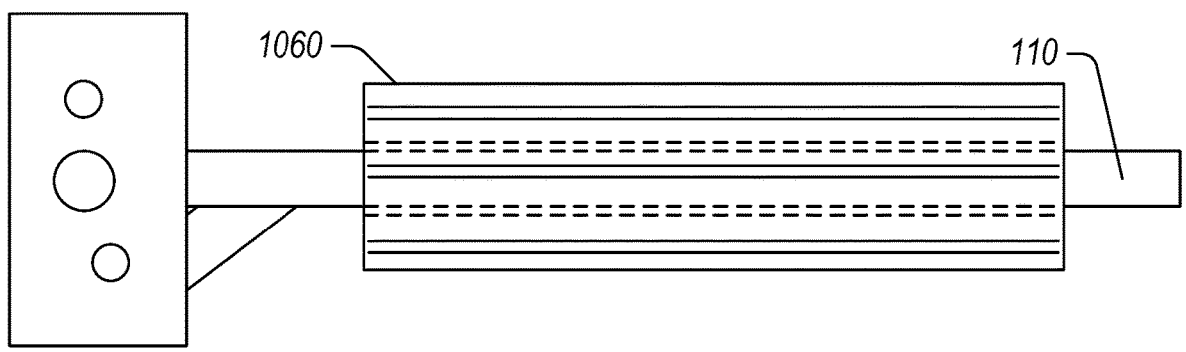
FIG. 10 illustrates an example multi-use mounting bracket with cylindrical massage apparatus supported by an extension of the multi-use mounting bracket.

FIGS. 8-10 illustrate examples of therapeutic accessories that can be supported by the extension 110 of a multi-use mounting bracket as described herein. It is to be understood that a ball or other similar accessory, as described herein with respect to FIGS. 6A-7, can be attached to a distal end of the accessory in conjunction with the therapeutic accessories supported by the extension 110. For example, the multi-use mounting bracket can hold a variety of commercially available foam massage rollers. This may enable a user to attach any particular foam roller which the user finds comfortable to gym rigging rather than being forced to use a particular roller which may come with a particular massage device. The extension 110 thereby becomes the axle for different foam rollers that may be slipped over it and supported by it.

FIG. 8 illustrates an example multi-use mounting bracket with a rigid cylinder 850 secured to the extension 110 of the multi-use mounting bracket. The rigid cylinder 850 can be a metal or other similar material with a smooth surface so that it slips over the body for therapeutic purposes. The rigid cylinder 850 can be releasably attached to the extension 110, allowing the rigid cylinder 850 to be replaced or interchanged with other therapeutic devices, such as foam rollers. In addition, the ball 640 described herein with reference to FIGS. 6A-6F can be attached to the distal end of the extension 110 after the rigid cylinder 850 has been attached to the extension 110 to provide a combination of apparatuses for therapeutic purposes. Advantageously, the rigid cylinder 850 can be configured to apply shear forces on the muscles of a user, where the shear forces indicate that the rigid cylinder 850 is capable of pulling the muscle tissues in a controlled manner to separate the individual muscle fibers from other muscle fibers in the same sheath or surrounding sheaths.

The rigid cylinder 850 includes collars 852 that are sized to fit snugly to the extension 110 (e.g., the inner radius of the collar is slightly larger than the outer radius of the extension 110). The collar 852 can be concentric with the rigid cylinder 850 and have an outer radius that is the same as the inner radius of the rigid cylinder 850. The collars 852 include set screws 854 that can be tightened to secure the rigid cylinder 850 to the extension. This can be done to prevent the rigid cylinder 850 from rotating and/or moving laterally across the extension 110. In some embodiments, the collars 852 can include bearings that allow the rigid cylinder 850 to spin while restricting lateral movement of the rigid cylinder 850 along the extension 110. The rigid cylinder 850 can be about 12 inches in length.

FIG. 9 illustrates the multi-use mounting bracket with a foam roller 955 supported by the extension 110. The foam roller 955 can be a 6-inch diameter EVA foam massage roller that slips over the extension 110 in a manner that allows the foam roller 955 to spin around the extension 110. The foam roller 955 can include collars to secure the foam roller 955 to the extension 110. In some embodiments, the collars can include bearings that allow the foam roller 955 to spin while restricting lateral movement of the foam roller 955 along the extension 110.

FIG. 10 illustrates the multi-use mounting bracket with a foam roller 1060 supported by the extension 110. The foam roller 1060 can be a 3-inch diameter EVA foam massage roller that slips over the extension 110 in a manner that allows the foam roller 1060 to spin around the extension 110. The foam roller 1060 can include collars to secure the foam roller 1060 to the extension 110. In some embodiments, the collars can include bearings that allow the foam roller 1060 to spin while restricting lateral movement of the foam roller 1060 along the extension 110. The foam roller 1060 can have a different surface texture and/or pliability than the foam roller 955 described herein with reference to FIG. 9. Thus, the foam rollers 955 and 1060 illustrate that the multi-use mounting bracket can support a variety of foam rollers to provide a desired and interchangeable therapeutic effect.

Figure 11:
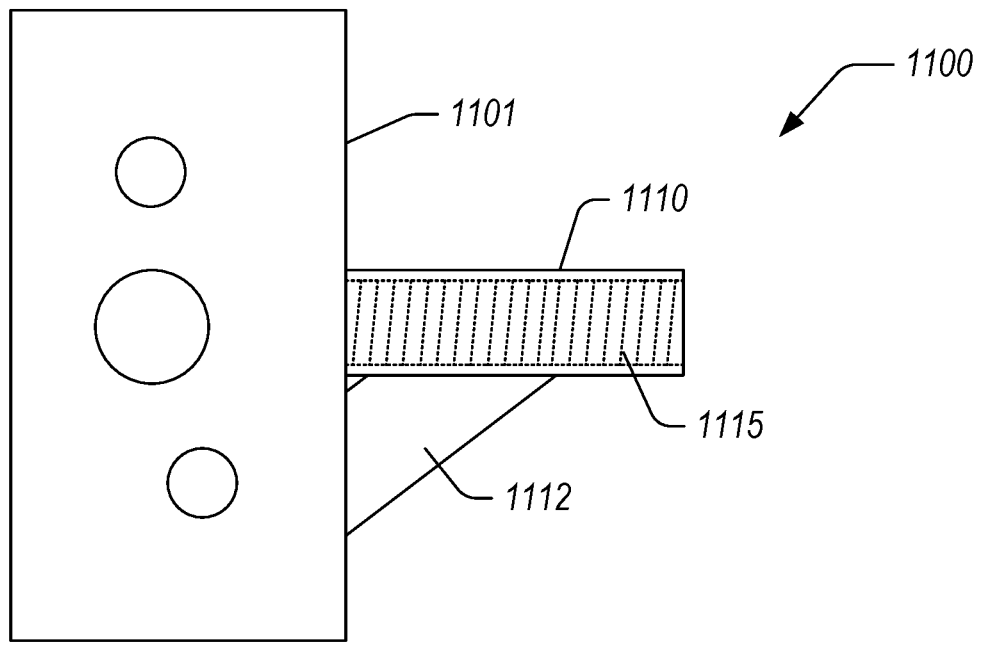
FIG. 11 illustrates an example multi-use mounting bracket with a threaded receptacle supported by a gusset, the threaded receptacle configured to receive an accessory.

FIG. 11 illustrates an example multi-use mounting bracket 1100 with an extension 1110 supported by a gusset 1112 and having a threaded receptacle 1115, the threaded receptacle 1115 configured to receive an accessory. The multi-use mounting bracket 1100 can be configured to have a shorter extension than other embodiments described herein. In some embodiments, the extension 1110 is less than or equal to about 6 inches in length, less than or equal to about 5 inches in length, or less than or equal to about 4 inches in length. The extension 1110 can be welded to the face plate 1101.

In some embodiments, the extension 1110 can attach to a threaded rod to effectively lengthen the extension 1110 to receive one or more of the therapeutic devices described herein, such as foam rollers and/or rigid cylinders. Advantageously, this makes it possible to attach different shapes, lengths, and/or diameters of a threaded rod to accommodate different massage roller apparatuses.

The gusset 1112 provides mechanical support to increase the strength of the multi-use mounting bracket 1100 in the presence of relatively large forces. In some embodiments, the extension 1110 includes a support rod welded within the hollow portion of the extension 1110, similar to the support rod 413 described herein with reference to FIG. 4. The support rod can be shortened to allow accessories to be attached to the extension 1110 using the threaded receptacle.

Figure 12:
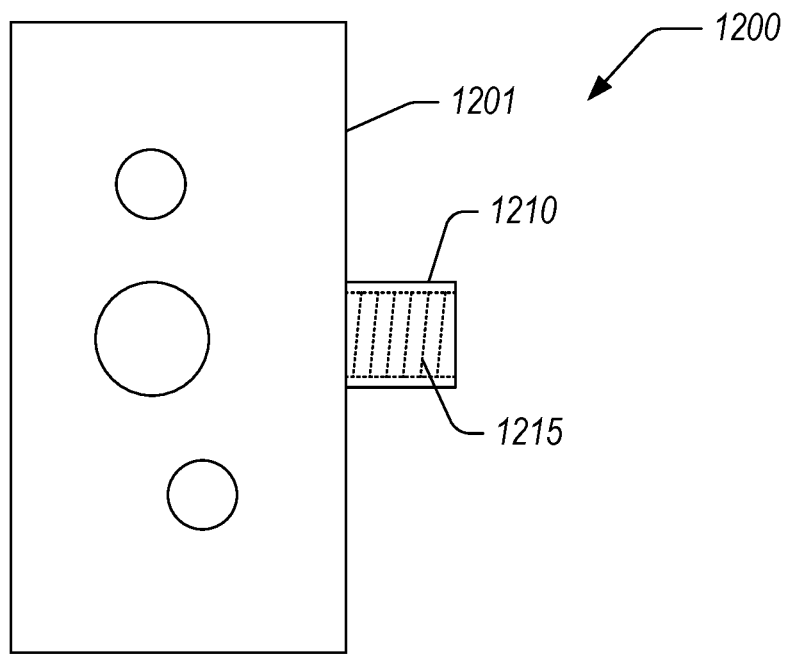
FIG. 12 illustrates an example multi-use mounting bracket with a threaded receptacle configured to receive an accessory.

FIG. 12 illustrates an example multi-use mounting bracket 1200 with an extension 1210 having a threaded receptacle 1215, the threaded receptacle 1215 configured to receive an accessory. The multi-use mounting bracket 1200 can be configured to have a shorter extension than other embodiments described herein and can be implemented without a gusset. In some embodiments, the extension 1210 is less than or equal to about 3 inches in length, less than or equal to about 2.5 inches in length, or less than or equal to about 2 inches in length. The outer diameter of the extension 1210 can be less than or equal to about 2 inches, less than or equal to about 1.5 inches, or less than or equal to about 1 inch. The extension 1210 can be welded to the face plate 1201.

In some embodiments, the extension 1210 can attach to a threaded rod to effectively lengthen the extension 1210 to receive one or more of the therapeutic devices described herein, such as foam rollers and/or rigid cylinders. Advantageously, this makes it possible to attach different shapes, lengths, and/or diameters of a threaded rod to accommodate different massage roller apparatuses. It is to be understood that the multi-use mounting brackets described herein can be implemented without the use of a gusset similar to the multi-use mounting bracket 1200.

Figure 13:
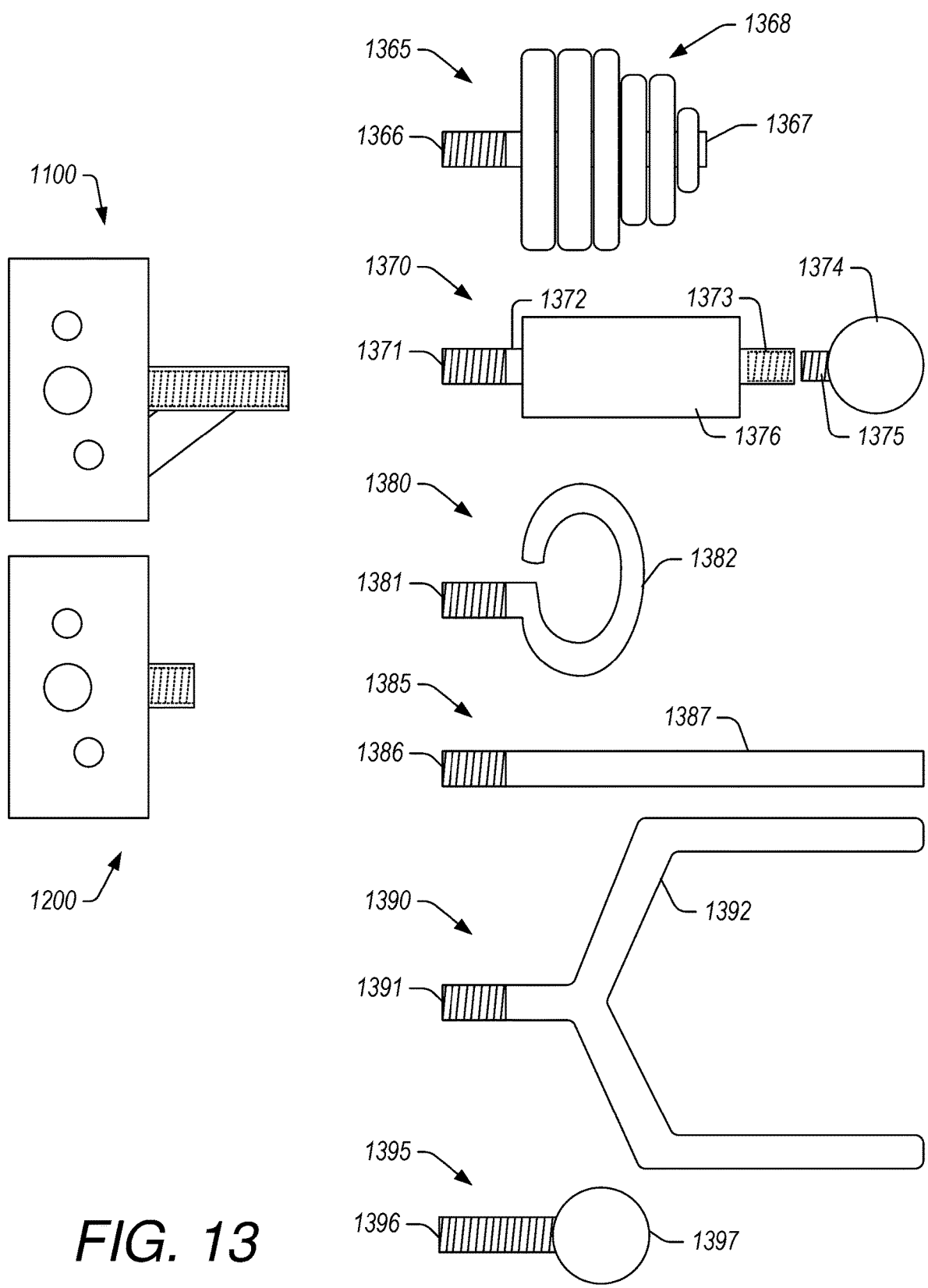
FIG. 13 illustrates examples of accessories that can be mounted to the example multi-use mounting bracket of FIG. 11 and/or the example multi-use mounting bracket of FIG. 12.

FIG. 13 illustrates examples of accessories that can be mounted to the example multi-use mounting bracket 1100 of FIG. 11 and/or the example mounting bracket 1200 of FIG. 12. It should be understood that accessories can be mounted to any of the multi-use mounting brackets disclosed herein and that the multi-use mounting brackets 1100 and 1200 are used here merely as examples. As stated elsewhere herein, the accessories in the figure are not to scale but are illustrated so that various features can be seen and understood.

A holder 1365 for weights 1368 is an example accessory. The holder 1365 includes a threaded male connector 1366 and a stout rod 1367 configured to support weights. The accessory can be attached to the multi-use mounting bracket 1100 or 1200 and attached securely to gym rigging.

A self-massage roller 1370 is another example accessory. The self-massage roller 1370 includes a rigid or pliable roller 1376 fitted over a rod 1372 having a threaded male connector 1371 at a proximal end and a threaded female receptacle 1373 at a distal end. In addition, a ball 1374 can be attached to the rod 1372 using a threaded male connector 1375 that is compatible with the threaded female receptacle 1373. In this way, the self-massage roller 1370 includes a roller 1376 and a ball 1374 to provide different therapeutic effects. In some embodiments, the ball 1374 can be attached directly to the multi-use mounting bracket 1100 or 1200 by coupling the threaded male connector 1375 with the compatible threaded female receptacle of the multi-use mounting bracket 1100 or 1200.

A band anchor 1380 is another example accessory. The band anchor 1380 includes a threaded male connector 1381 and a hook 1382. The band anchor 1380 can be used to attach various sizes of elastic work out bands to gym rigging. The band anchor 1380 can also be configured to hold exercise ropes that can be used in a gym. The band anchor 1380 can be used to hang or to attach accessories to weight lifting rigging, such as elastic tubing which is used to exercise and strengthen shoulders and arms. The band anchor 1380 can also be used to attach a stout elastic band which is often used by physical therapists and athletes to exercise the hips and legs. The band anchor 1380 can be designed with a small hook 1382 for light-weight bands or a larger hook 1382 for stronger elastic bands.

A youth pull-up bar 1385 (or push up bar) is another example accessory. The pull-up bar 1385 includes a threaded male connector 1386 at a proximal end of a bar 1387. The pull-up bar 1385 can be about 30-40 inches in length and can be mounted horizontally to gym rigging at various heights off the gym floor. This can allow lighter people (e.g., young people) to do pull ups and to allow other users to do modified push-ups that work the muscles differently and that may require less strength than doing push-ups on the floor. The pull-up bar 1385 can also be used for balance during squats or stretches, to support a leg during stretching, etc.

A dip bar 1390 is another example accessory. The dip bar 1390 includes a threaded male connector 1391 at a proximal end of two bars 1392 attached in a horizontal position resembling the horns of a bull.

A massage ball 1395 is another example accessory. The massage ball 1395 includes a threaded male connector 1396 and a sphere 1397 attached to the connector 1396. The massage ball 1395 can be similar to a lacrosse ball or other similar spherical massage apparatus.

It is contemplated that the multi-use mounting brackets described herein can be adapted to a wide variety of weight-lifting and fitness accessories including, but not limited to, self-massage accessories, matador devices which may be used to perform dips, weight plate storage devices, push up bars which are often attached to gym rigging at different elevations, pull up bars, J-hooks which may be used to hold weight lifting bars in elevated positions, hooks for other devices such as resistance bands, specially shaped devices that mimic the types of pressures caused by the fingers and thumbs, etc.

As used herein, the term gym rigging refers to racks and riggings and components thereof that are used to support exercise equipment or that are used as an apparatus during exercise. Accordingly, gym rigging includes vertical and horizontal posts, exercise racks, gym rigging, power racks, squat stands and/or racks, pull up stations, cable machines, bench press stations, and the like. In addition, as used herein, the term gym accessory includes any device or apparatus that can be used in a gym and that may be secured to gym rigging. Gym accessories include exercise equipment and therapeutic devices and accessories.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A multi-use mounting bracket for mounting a gym accessory to different configurations of gym rigging, the bracket comprising:
    a face plate having a top side, a bottom side vertically opposite the top side, a left side, a right side horizontally opposite the left side, a front face, and a rear face opposite the front face;
    a first side flange extending from the right side of the face plate, the first side flange forming a first hole and a second hole, the first hole sized and positioned to accommodate a first gym rigging and the second hole sized and positioned to accommodate a second gym rigging different from the first gym rigging;
    a second side flange extending from the left side of the face plate, the second side flange parallel to the first side flange, the second side flange forming a third hole that is aligned with the first hole and a fourth hole that is aligned with the second hole; and
    an extension having a proximal end welded to the face plate and extending from the face plate in a direction opposite to the first side flange and to the second side flange,
    wherein a vertical distance between the bottom side of the face plate and the top side of the face plate is at least 5 inches and less than or equal to 9 inches,
    wherein a vertical distance from the bottom side of the face plate to a center of the first hole is at least 0.75 inches and less than or equal to 2 inches,
    wherein a vertical distance from the top side of the face plate to a center of the second hole is at least 0.75 inches and less than or equal to 2 inches, and
    wherein the mounting bracket is configured to be used in a standard orientation with the top side above the bottom side and in an inverted orientation with the bottom side above the top side.

2. The bracket of claim 1, wherein a distance between the first side flange and the second side flange is configured to accommodate the first gym rigging and the second gym rigging.

3. The bracket of claim 1, wherein the extension comprises a hollow cylinder.

4. The bracket of claim 3, wherein the extension comprises an extension rod affixed to the face plate within the hollow cylinder.

5. The bracket of claim 1, wherein a distal end of the extension is threaded.

6. The bracket of claim 1, wherein the first side flange forms a fifth hole and the second side flange forms a sixth hole that is aligned with the fifth hole.

7. The bracket of claim 6, wherein the fifth hole is vertically between the first hole and the second hole and the sixth hole is vertically between the third hole and the fourth hole.

8. The bracket of claim 6, wherein the fifth hole and the sixth hole have a diameter that is larger than a diameter of the first hole, the second hole, the third hole, and the fourth hole.

9. The bracket of claim 1 further comprising a cushion affixed to the rear face of the face plate.

10. The bracket of claim 9, wherein the cushion is vertically aligned with the extension.

11. The bracket of claim 1 further comprising gusset coupled to the front face of the face plate and to the extension to support the extension.

12. The bracket of claim 1, wherein the vertical distance from the bottom side of the face plate to the center of the first hole is configured to provide a suitable distance from a fulcrum point defined by the first hole to resist vertical forces such that the multi-use mounting bracket remains substantially stationary responsive to vertical forces.

13. The bracket of claim 1, wherein the vertical distance from the top side of the face plate to the center of the second hole is configured to provide a suitable distance from a fulcrum point defined by the second hole to resist vertical forces such that the multi-use mounting bracket remains substantially stationary responsive to vertical forces.

14. The bracket of claim 1, wherein a width of the first side flange and the second side flange, as measured in a direction perpendicular to the rear face of the face plate, is configured to provide a suitable distance from a fulcrum point defined by the first hole or the second hole to resist horizontal forces such that the multi-use mounting bracket remains substantially stationary responsive to horizontal forces.

15. The bracket of claim 1, wherein the face plate, the first side flange, and the second side flange are made of a single piece of metal.

* * * * *